(12) United States Patent
Kremkau et al.

(10) Patent No.: US 10,011,152 B1
(45) Date of Patent: Jul. 3, 2018

(54) MODULAR SUBMERSIBLE SURVEY VEHICLE

(71) Applicant: Gahagan & Bryant Associates, Inc., Tampa, FL (US)

(72) Inventors: Kevin M. Kremkau, Tampa, FL (US); Don G. Donaldson, III, Tampa, FL (US); Jonathan R. Barker, Palmetto, FL (US); Paul A. Seaboldt, Seal Beach, CA (US); Edward J. Blayer, Barnegat, NJ (US)

(73) Assignee: Gahagan & Bryant Associates, Inc., Tampa, FL (US)

( * ) Notice: Subject to any disclaimer, the term of this patent is extended or adjusted under 35 U.S.C. 154(b) by 0 days.

(21) Appl. No.: 15/459,884

(22) Filed: Mar. 15, 2017

(51) Int. Cl.
| | |
|---|---|
| *B60F 3/00* | (2006.01) |
| *B63H 19/08* | (2006.01) |
| *G05D 1/00* | (2006.01) |
| *B63H 21/17* | (2006.01) |
| *B63H 21/165* | (2006.01) |
| *B60R 11/04* | (2006.01) |

(Continued)

(52) U.S. Cl.
CPC .......... *B60F 3/0061* (2013.01); *B60F 3/0015* (2013.01); *B60R 11/0258* (2013.01); *B60R 11/04* (2013.01); *B63H 21/165* (2013.01); *B63H 21/17* (2013.01); *G01C 13/00* (2013.01); *G05D 1/0011* (2013.01); *B63B 2211/00* (2013.01); *B63B 2213/02* (2013.01); *B63B 2755/00* (2013.01)

(58) Field of Classification Search
CPC ........ B60F 3/00; B60F 3/0015; B60F 3/0061; B63H 21/165; B63H 21/17; B63B 2755/00; B63B 2211/00; B63B 2213/00; B63B 2213/02; B63B 2207/00; B63B 2207/02; B60R 11/04; B60R 11/0258; G05D 1/0011; G01C 13/00

USPC ....... 114/312, 313, 321, 330, 331, 333, 335, 114/339, 341, 342; 440/12.5, 12.56, 440/12.63, 12.64; 180/7.1, 8.2, 8.7, 9.1, 180/65.8

See application file for complete search history.

(56) References Cited

U.S. PATENT DOCUMENTS

| | | |
|---|---|---|
| 3,500,648 A | 3/1970 | Daniell |
| 4,713,896 A | 12/1987 | Jennens |

(Continued)

FOREIGN PATENT DOCUMENTS

| | | |
|---|---|---|
| WO | 8705878 | 10/1987 |

*Primary Examiner* — Daniel V Venne
(74) *Attorney, Agent, or Firm* — Hoffmann & Baron, LLP

(57) ABSTRACT

A modular submersible survey vehicle ("MSSV") that includes a pair of continuous tracks, a chassis, a shell and a plurality of watertight modules. The MSSV can also include a mast with a mast topper, and a remote control device. A chassis is mounted on the pair of continuous tracks and covered by the shell on the sides and top but open on the bottom. The watertight modules are mounted on the chassis and contain mechanical devices and electronic components for locomotion, controlling movement of the MSSV, surveying and wireless communication. The mast topper can support a radio antenna, a global positioning antenna, a WiFi an antenna, a light and/or a camera. The remote control device is used to control the MSSV from a remote location. The shell is vented so that water freely passes into and out of the shell through the open bottom of the chassis.

30 Claims, 20 Drawing Sheets

(51) Int. Cl.
*B60R 11/02* (2006.01)
*G01C 13/00* (2006.01)

(56) References Cited

U.S. PATENT DOCUMENTS

| | | | |
|---|---|---|---|
| 4,961,395 A | 10/1990 | Coast | |
| 6,263,989 B1* | 7/2001 | Won | B25J 5/005 180/8.7 |
| 7,654,348 B2* | 2/2010 | Ohm | B25J 5/005 180/8.2 |
| 7,784,570 B2* | 8/2010 | Couture | B25J 5/005 180/65.8 |
| 8,100,205 B2* | 1/2012 | Gettings | B62D 55/075 180/9.1 |
| 8,256,542 B2* | 9/2012 | Couture | B25J 5/005 180/8.7 |
| 8,317,555 B2* | 11/2012 | Jacobsen | B63C 11/52 114/312 |
| 8,511,247 B2 | 8/2013 | Inoue | |
| 8,800,695 B2* | 8/2014 | Couture | B25J 5/005 180/7.1 |
| 9,146,558 B2* | 9/2015 | Field | G05D 1/0044 |
| 9,227,654 B2* | 1/2016 | Wolf | B62D 55/084 |
| 9,248,874 B2 | 2/2016 | Won | |
| 9,487,281 B2 | 11/2016 | Wolfenbarger | |
| 2004/0216932 A1 | 11/2004 | Giovanetti et al. | |

\* cited by examiner

REPLACEMENT SHEET
Serial No. 15/459,884

9 of 20

MODULAR SUBMERSIBLE SURVEY VEHICLE

FIELD OF THE INVENTION

The present invention is a submersible vehicle for surveying underwater areas bordering the shoreline of a body of water, including oceans, rivers and lakes. In particular, the present invention relates to a remotely controlled submersible vehicle having modular construction.

BACKGROUND OF INVENTION

The development of shore line areas and the need to restore beaches and coastal areas damaged by storms and erosion have created numerous dredging and filling projects. Typically, a dredging and filling project involves dredging an off-shore area and depositing the dredged materials on selected areas along a coast to expand the shoreline. In populated regions where land is at a premium, it may be desirable to increase the shoreline in order to construct new buildings or facilities. Along beaches, it is often necessary to deposit fill on a beach to repair damage done by a storm. In most cases, project technical specifications and regulations require the designated shoreline to be surveyed before, during and after the project.

Various methods have been used to conduct coastal surveys between the shore and the bordering benthic zone. The current survey methodology used on federal beach nourishment contracts typically employs Real Time Kinematic ("RTK") global positioning systems ("GPS") along the upland portion of the beach profile at low tide. This procedure can be used out into the surf to a depth where the rodman's feet do not leave the seafloor, as swimming is generally prohibited by United States Army Corps of Engineers (USACE) regulations. Hydrographic data is then obtained from a survey vessel operating at high tide and collecting data along the offshore and near shore portions of the beach profile; attempting to obtain overlap with the topographic data, as required by USACE districts. This requires the survey vessel to potentially enter the surf zone, which increases risk to personnel and equipment.

The survey vehicles currently being used have various problems, including restricted mobility, lengthy staging times, inability to operate in adverse weather or surf conditions, and lost time due to maintenance issues. Therefore, there is a need for a survey vehicle that provides safer collection of survey data in the surf zone, while also increasing productivity.

SUMMARY OF THE INVENTION

In accordance with the present invention, a modular submersible survey vehicle ("MSSV") is provided. The MSSV comprises, consists of or consists essentially of: a pair of continuous tracks, a chassis, a shell and a plurality of watertight modules. The MSSV can also include a mast with a mast topper, a remote control device and an auxiliary power module.

Each of the pair of continuous tracks includes a hydraulic motor that is driven by a hydraulic pump actuated by a motor, preferably a variable speed electric motor, housed in one of the plurality of watertight modules.

The chassis is mounted on the pair of continuous tracks and the chassis has a longitudinal axis between a first end and a second end, first and second sides, a top side, and a bottom side. The chassis has an open frame structure that allows water to freely pass through. The open frame structure of the chassis includes a plurality of elongate members extending parallel to the longitudinal axis and between a first or bow bulkhead at the first end and a second or stern bulkhead at the second end and a plurality of transverse ribs attached to the plurality of elongate members extending between the first or port side and the second or starboard side. A member with an aperture extends upwardly from the port side and the starboard side of each of the bow and stern bulkheads and above the top wall of the shell. The apertures are adapted for the connection of cables that are used to lift the MSSV. The MSSV can have a bow rollover bar that extends from the first end of the chassis and a stern rollover bar that extends from the second end of the chassis to provide stability when the MSSV is operating on uneven surfaces. The chassis can also have a mast support structure that extends from the bottom side of the chassis, through the top wall of the shell to a mast base plate.

The shell is attached to the chassis and includes side walls on the first and second sides of the chassis and a top wall extending between the side walls. The top wall and side walls define an interior with an open bottom portion. The shell can also include a bow wedge-shaped section that is attached to the first end of the chassis and a stern wedge-shaped section that is attached to the second end of the chassis. The bow wedge-shaped section and the stern wedge-shaped section each has a top surface that slopes downwardly at an angle of from 20 degrees to 40 degrees from the top side of the chassis and a bottom surface that slopes upwardly at an angle of from 20 degrees to 40 degrees from the bottom side of the chassis as each extends to a bow and a stern, respectively. The shell can have one or more vents that allow air and water to freely flow into and out of the interior of the MSSV. The open structure of the chassis, the open bottom portion of the shell and the one or more vents in the shell allow water to freely flow into and out of the interior when the MSSV moves into and out of a body of water.

The plurality of watertight modules is mounted on the chassis inside the shell. The modules contain mechanical devices and electronic components for locomotion, controlling movement of the MSSV, surveying and wireless communication. One of the plurality of watertight modules is a hydraulic power unit ("HPU") module that includes an electric motor and a hydraulic pump. Preferably, the HPU module has two variable speed electric motors and two hydraulic pumps with one motor and one pump dedicated to each of the tracks. One of the plurality of watertight modules is a control processing unit ("CPU") module that contains a CPU for controlling the movement of the MSSV and/or for controlling surveying equipment. The MSSV can also be provided with a watertight module that includes lightning arrestor equipment and a watertight module that includes one or more batteries. Preferably, two modules contain batteries in order to provide redundancy. Independent isolated battery compartments utilize a mechanism to preserve isolation between the battery banks and still provide the CPU enclosure with uninterrupted power from any one or all active battery enclosures for redundancy. The watertight modules can be connected to each other or to equipment on the MSSV by one or more watertight conduits.

The mast extends upwardly from the mast base plate above the top wall of the shell to a mast top. A mast topper can be disposed on the top of the mast. The mast topper can have one or more members extending outwardly from the mast that can support one or more communications antennas, one or more global positioning antenna, a WiFi an antenna, lights and/or cameras.

The mast base plate has a top surface and can be connected to the mast support structure by a hinge that pivots the surface of the mast base plate at least 90 degrees between a vertical and horizontal orientation. The MSSV can include a gin pole that is attached to the hinged mast base plate and extends in the direction of the second end of the chassis. When the mast is in a vertical orientation, the gin pole forms an angle with the mast of from 60 degrees to 90 degrees. The MSSV can also include a winch stand having an elongate member extending outwardly from the second end of the chassis to a distal end and a stanchion extending upwardly from the distal end to a winch support platform. A winch is mounted on the platform and the gin pole and winch are used to raise the mast.

The remote control device communicates wirelessly, preferably over two or more radio links for redundancy, with one or more CPUs to provide remote control of the movement of the MSSV and/or remote control of the surveying equipment. The MSSV can have one or more watertight CPU modules. One CPU module can have a controller that communicates with a wireless remote control device to remotely control the movement of the MSSV, a camera, a spotlight and/or a robotic device. Another CPU module can have a global positioning system, one or more inclinometers, an inertial measurement unit (IMU), and/or a laser distance measuring device, which communicate wirelessly with a tablet computer or lap top computer for remote operation and monitoring. Preferably, two or more CPUs are used to provide redundancy.

The MSSV can have an auxiliary power module that provides electric power to the MSSV for powering the devices on the MSSV or for recharging the batteries. The auxiliary power module can include a trailer attached to the MSSV and a gas-powered electric generator housed in an enclosure. The auxiliary power module is used when the MSSV is on dry ground or in shallow water, preferably water that is less than two feet deep.

BRIEF DESCRIPTION OF THE FIGURES

The preferred embodiments of the modular submersible survey vehicle of the present invention, as well as other objects, features and advantages of this invention, will be apparent from the accompanying drawings wherein.

DETAILED DESCRIPTION OF THE INVENTION

Figure 1:
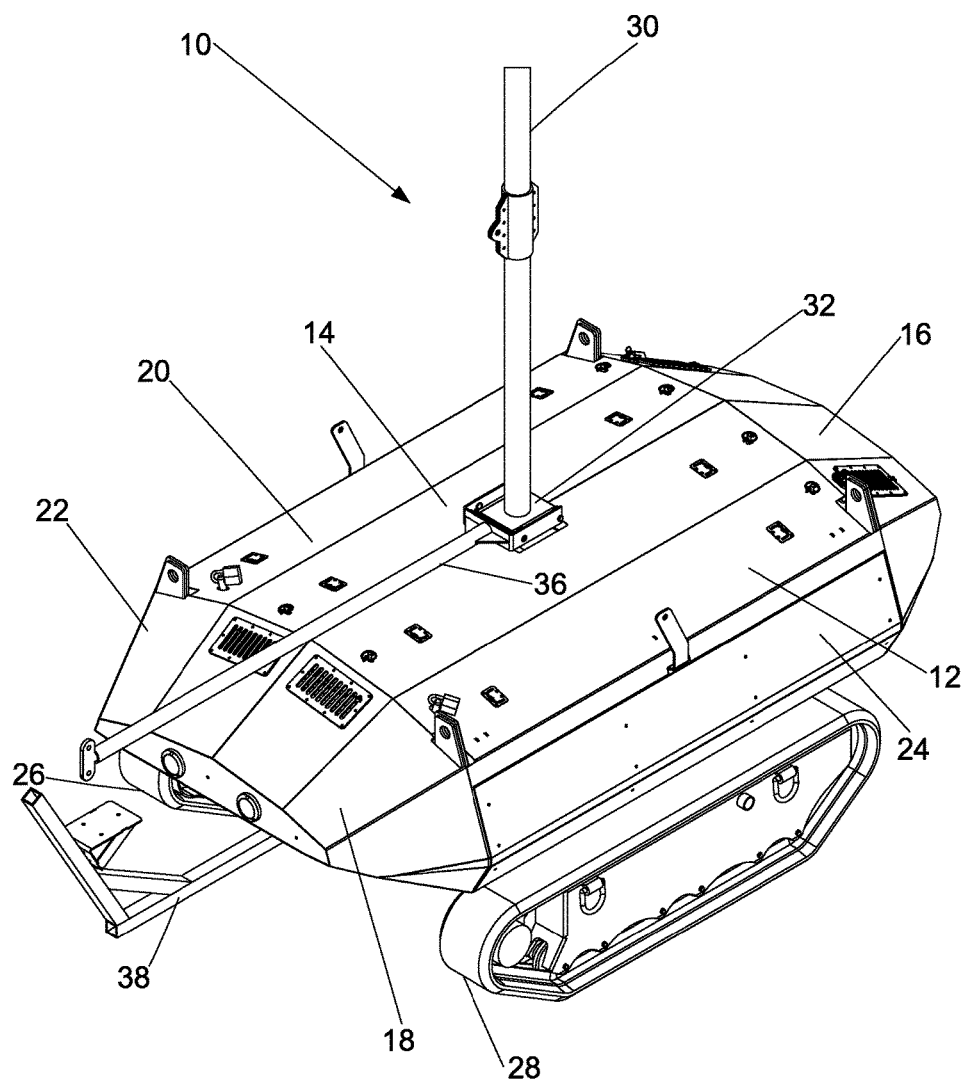
FIG. 1 is a peripheral rear view of an embodiment of the modular submersible survey vehicle.

The present invention is a modular submersible survey vehicle (also referred to herein as "MSSV") that includes an exterior shell that houses a plurality of modular units for controlling the movement of the vehicle, surveying the surrounding area and communicating with an operator at a remote location. The exterior shell is designed to allow water to freely pass into the interior of the MSSV and contact the watertight modular units, while protecting the modules from debris and other objects that may be in the water. This design provides several advantages by eliminating the need for ballast when the MSSV submerges and de-ballasting when it returns to the surface. The modules are also designed to be easily removed and replaced so that downtime is minimized. Preferably, the modules are bolted onto the chassis of the MSSV and watertight conduits connecting the modules are attached. The modular design isolates the different systems so that, if a watertight module is breached, only the equipment in one module is affected. In other submersible vehicles, a breached shell can result in most of the equipment in the vehicle being exposed to water and damaged.

The MSSV is a remotely controlled vehicle that is used to more safely and effectively perform beach profile surveys through the surf zone. The MSSV removes the risk involved with navigating a boat into the surf zone or having a rodman (i.e., the person holding a survey rod) wade into the surf zone to collect survey data. The MSSV is designed to collect hydrographic and topographic survey data using a variety of survey technologies including a global positioning system ("GPS"), a Light Detection and Ranging (LiDAR), an acoustic distance measuring device, a magnetometer, and side scan sonar. One or more GPS antennas, preferably two GPS antennas, are mounted on the mast topper on top of the mast, and one or more (preferably two) inclinometers are mounted in the CPU module to collect positioning data, which is transmitted to the computer interface. The inclinometers apply pitch and roll corrections to the survey data. An Inertial Measurement Unit ("IMU") can also be used to provide angular corrections to GPS data. The MSSV is also designed to collect environmental sampling data including water samples, sediment samples, sediment cores, photographs, and videos.

The MSSV vehicle system is equipped with several enhancements for use in dynamic marine environments. In addition to the shell mitigating the forces generated by high currents and large waves, the MSSV has a specially designed chassis with integrated skid plate that provides optimal approach angles for ground clearance to minimize obstacle entanglement. The MSSV can operate along the shore lines of oceans, seas, rivers and lakes to accurately survey the area from the shore out into the body of water. The most challenging conditions occur in the surf along an ocean shoreline where the MSSV must be capable of continuous operation in rough surf conditions. The flooded shell increases the weight of the MSSV and reduces the likelihood that the MSSV will be rolled over by the force of the waves impacting the vehicle. The added weight of the water inside of the shell also stabilizes the MSSV and makes it easier for the direction of the vehicle to be controlled.

Compactness of Vehicle Design for Transport

The MSSV is a remotely operated benthic vehicle designed to serve as a platform for surveying, mapping, and remote sensory data acquisition in marine environments and shallow seas. The MSSV vehicle system is categorized as a "Special Use Crawler Type, Heavy Weight, Working Class, Autonomous Underwater Vehicle" by the US Navy's UUV Master Plan (2004 edition, section 5.1.3). The MSSV is designed for easy transport to a job site in an enclosed trailer. Preferred embodiments of the MSSV are about 6 feet wide, 9 feet long, and weigh approximately 4,500 pounds. The MSSV can have several watertight modules (also referred to herein as enclosures) depending on the nature of the deployment. The modular design of the MSSV system enhances its flexibility and capability so that sensors and systems required for a particular deployment can be easily installed. There is an internal sensor system within one of the watertight modules that measures systems and environmental data, such as electrical and hydraulic power parameters, temperature, humidity, and water levels. This system ensures reliable operation and provides warning to the operator of issues that may arise during operation. Survey and data collection systems compatible with the MSSV include, Real Time Kinematic GPS, LiDAR surveying, soil and water sampling, and hydrodynamic sensors.

The MSSV is constructed using a plurality of modules containing equipment and systems that perform a variety of functions. The MSSV is often deployed in locations where it is subjected to severe surf conditions and corrosive salt water. Under such conditions, even the most robust equipment can experience physical damage and component failures. The MSSV is designed to minimize downtime and to be easily repairable at the worksite without having to be removed to a repair facility. This is accomplished by the modular design that isolates the different systems of the MSSV in modules that can be easily removed and replaced. The main modules of the MSSV are the track system and chassis, the shell with front and rear wedge-shaped sections, the hydraulic drive system, the battery module, the navigation system, the surveying instruments, the communications equipment, the mast and mast topper, and the auxiliary power system. Depending on the number of systems required for a particular project, the different systems can be housed in a module with another system or can be in a separate module. In a preferred embodiment, all of the operational control units and survey controls are located in a single module.

As used herein, the term "module" is defined as an independent unit in the form of a watertight enclosure that is combined with other modules to construct the MSSV.

As used herein, the term "shell" or "hull" refers to an exterior structure extending over the top and sides of the chassis and on all sides of the bow and stern wedge-shaped sections to define an interior. The section below the chassis is open.

As used herein the term "vent" is defined as an opening (or openings) in the shell of any size, shape or location that permits the free passage of air and/or water into and out of the MSSV.

As used herein, the term "submersible" is defined as the ability for the MSSV to operate for extended periods of time in a body of water with the top of the shell below the surface of the water.

As used herein, the term "watertight" is defined as constructed to be impermeable to water when submerged in water of up to at least 30 feet in depth.

As used herein, the term "benthic zone" is defined as the ecological region at the lowest level of a body of water such as an ocean or a lake, including the sediment surface and some sub-surface layers.

As used herein, the term "surf zone" is defined as the area from the beach extending out into the body of water and includes the area offshore where waves break, between the outermost breaker and the limit of wave uprush. It is the zone within which waves approaching the coastline start breaking, usually in water depths of 16 to 32 feet (5 to 10 meters).

As used herein, the term "endless track" or "continuous track," also called tank tread or caterpillar track, is defined as a system of vehicle propulsion in which a continuous band of treads or track plates is driven by two or more wheels. The vehicle's weight is transferred to the bottom length of track by a number of road wheels, or sets of wheels called bogies. Road wheels are typically mounted on some form of suspension to cushion the ride over rough ground. Transfer of power to the track is accomplished by a drive wheel, or drive sprocket, driven by the motor and engaging with holes in the track links or with pegs on the track links to drive the track.

As used herein, the term "conduit" is defined as any hollow elongated member, including but not limited to metal or plastic tubes or pipes, armored or unarmored flexible hoses capable of housing fluidic tubing, pipes, electrical wires and/or cables.

As used herein, the term "Wi-Fi" or "WiFi" is an acronym for "wireless fidelity, wireless internet" and is defined as the standard wireless local area network ("WLAN") technology for connecting computers and myriad electronic devices to each other and to the Internet.

As used herein, the term "lightning arrester" refers to a device used on electrical power systems and telecommunications systems to protect the insulation and conductors of the system from the damaging effects of lightning. The lightning arrester has one or more voltage terminal(s) and a ground terminal. When a lightning surge travels along the power or communication line to the arrester, the current from the surge is diverted through the arrestor, in most cases to earth or the body of the conductive enclosure, encompassing the devices.

As used herein, the term "SAE J1772" refers to a Society of Automotive Engineers standard for electrical connectors for electric vehicles and it covers the general physical, electrical, communication protocol, and performance requirements for the electric vehicle conductive charge system and coupler. The intent is to define a common electric vehicle conductive charging system architecture including operational requirements and the functional and dimensional requirements for the vehicle inlet and mating connector.

Modular Design

The MSSV is designed with modular component design for servicing interchangeability, mission oriented configuration options, and equipment failure mitigation. The MSSV can also be assembled with fewer, but larger, water tight enclosures that still allow configurability on internal rack systems attached to the chassis. The number of modules used to house the components is not intended to limit the scope of the invention. Preferred embodiments of the MSSV have communication, power, and hydraulic cables running through glands, which are attached to bulkheads and then mounted to the modules. All communication and power from the mast topper run through the mast into the arrestor module through individual glands, then either to the electronics enclosure(s) or the hydraulic enclosure. In some embodiments of the MSSV, power and communication cables are run between the modules in bundles and through potted tubes attached to the bulkheads.

The modular components of the MSSV include the tracks and chassis, the outer body or shell, the mast, the mast topper for mounting GPS, communications and safety equipment and the watertight modules that contain the batteries, hydraulic power unit (HPU), communication equipment, survey equipment, and lightning arrester.

Each of the modules of the MSSV is watertight and connected to one or more of the other modules by watertight conduits, preferably flexible conduits with fittings for connecting to the modules. The conduits carry electrical wires and cables, but can also be used to protect the hydraulic lines. The conduits are filled with caulking to form a seal between modules so that if one watertight module is breached, water does not enter the other modules through the conduits. The modular construction of the MSSV allows a module to be easily and quickly replaced when it is damaged from water or is inoperable due to a mechanical or electrical failure.

Tracks

In preferred embodiments, locomotion of the MSSV is provided by a pair of tracks, preferably rubber tracks, mounted on an undercarriage or chassis and driven by electrically powered hydraulic pumps. Different track lengths and widths can be selected to suit the environment in which the MSSV is operating. The size of the body mount can be changed so that the chassis can be fitted with tracks having a variety of different widths and a variety of different multiple lengths to provide efficient operation under different conditions.

Each track can be made of modular steel plates or synthetic rubber reinforced plates with steel wires to meet the requirements of the specific location. For example, steel plates may be preferred when the bottom is mostly rocks, while rubber reinforced plates may be preferred for a muddy or sandy bottom. The large surface area of the tracks distributes the weight of the vehicle better than rubber tires on an equivalent vehicle, enabling a continuous tracked vehicle to traverse soft ground with less likelihood of becoming stuck due to sinking. The prominent treads of the metal plates are both hard-wearing and damage resistant, especially in comparison to rubber tires. In some cases, a reinforced rubber belt with chevron treads can be used in place of rubber tracks with linked rubber plates. The preferred track system for the MSSV uses tracks with synthetic rubber plates or a continuous rubber belt with chevron treads.

Although a continuous track system is the preferred form of locomotion for the MSSV, other systems can be used such as tires, preferably over-sized and/or extra-wide tires. The present invention also contemplates a system with a combination of a continuous track system on one end of the MSSV and tires on the other end. A continuous track system suitable for use with the MSSV is Model TOA-5000-73-T2B-SB, manufactured by Chermack Machine Inc., Cameron, Wis., with rubber tracks and open loop hydraulic planetary drive motors.

Chassis Module

The chassis module includes a steel frame with body mounts, and a skid plate. Roll bars extending outwardly from the bow and/or the stern can be provided to increase the stability of the MSSV in rough surf conditions. The chassis is formed by a plurality of elongate members that extend between the bow and stern bulkheads and a plurality of transverse ribs. A bracket extends upwardly from either end of each of the ribs and the side walls of the shell are attached to these brackets. The elongate members and transverse ribs form a lattice-like structure with a plurality of openings, which allow water to freely flow through the chassis and into the interior of the MSSV. A plurality of mounts on the port and starboard sides of the chassis are used to attach the chassis to the tracks. However, other methods for attaching the chassis to the tracks can be used and these methods are well known to one of ordinary skill in the art. The method and components used to attach the chassis to the tracks is not intended to limit the scope of the invention.

Shell Module

The shell or hull is the exterior skin of the MSSV and it has three sections: a center section, a bow (front) wedge-shaped section and a stern (rear) wedge-shaped section. The center section is attached to and extends over the chassis between the bow and stern bulkheads and between the port and starboard (i.e., left and right) sides. A top wall extends between the port and starboard side walls of the chassis. Preferably, the side walls and the top wall have a convex exterior surface, which along with the wedge-shaped design of the bow and stern sections creates a hydrodynamic profile that facilitates movement of the MSSV in the surf and when submerged. Underwater lights and cameras can be attached to the bow and stern wedge-shaped sections to provide a remote operator with visual information for the area in which the MSSV is operating. In addition, the shell also protects cables and radiators on the exterior of the bow and stern bulkheads from ocean waves and debris.

The bow and stern wedge-shaped sections each have top and bottom surfaces that slope towards each other as they extend away from the chassis or center section. The top and bottom surfaces slope upwardly and downwardly, respectively, at an angle of from 20 degrees to 40 degrees, preferably about 30 degrees. Vents in the top and bottom surfaces allow air and water to freely pass in and out of the shell so that, when the MSSV is driven into a body of water it quickly floods and, when driven out, it quickly drains. The shell provides protection for the watertight modules mounted in the interior, as well as providing the MSSV with a hydrodynamic shape for operating through waves and under water. The shell protects the individual modules and interconnecting conduits inside the MSSV from the impact of objects in the water, waves greater than 6 feet, swift currents, and objects on the sea floor.

HPU Module

The MSSV system utilizes a pair of high torque tracks for locomotion. The drive system for the two tracks is provided by the hydraulic power unit ("HPU") module, which is housed in a watertight enclosure and includes the electric motors (preferably variable speed electric motors), hydraulic pumps, motor controllers, and shifting hardware. The size of the HPU module can be changed depending the size of the electric motors, motor controllers, and pumps needed for a specific deployment or track size. Preferably, the HPU includes two independent hydraulic circuits, one for each track. Each hydraulic circuit includes a shared reservoir, a hydraulic pump driven by an electric motor and two or more solenoids valves. The solenoid valves are used to route and re-route the hydraulic fluid through different lines to the plurality of ports (i.e., hydraulic line connections) on the hydraulic motor (also referred to herein as "rotors") that drives the track. Switching the route of the hydraulic fluid controls the gear selection and direction of the tracks—either forward or reverse motion.

The track drive system uses a pair of rubber track drives, each driven by a hydraulic drive motor (rotor) mounted on the track. The hydraulic drive motors are equipped with selectable high and low gear reductions, neutral, and integrated parking brake operated via the hydraulic fluid lines. Each drive motor is powered by hydraulic fluid supplied by a dedicated hydraulic pump driven by a variable electric motor and housed within the HPU module. An electronic control system and a remote control system allow the operator to configure all gear selections and drive output remotely via a remote-control interface. The electronic control system and remote control modules are designed to ensure safe vehicle operation through the implementation of several safety measures including an emergency stop system to prevent rouge operation. A suitable wireless controller for the hydraulic drive system is Model No. BU-9H8D, manufactured by Cervis, Inc., Warrendale, Pa. In another embodiment of the MSSV, each of the tracks is powered by a direct drive water proof electric motor. A suitable motor controller for the MSSV is Model No. Gen4, manufactured by Sevcon, Ltd., Gateshead, England.

Survey Systems and CPU Module

The Survey Systems and CPU module consists of a water tight enclosure that contains the survey systems and computers used for data collection. Preferably, the enclosure contains two custom built computers, a Real Time Kinematic GPS system, and two inclinometers that provide corrections for pitch and roll. The enclosure can also contain the controls for a robotic sampling device that collects samples from the benthic zone. A suitable GPS for the MSSV is Model SPS461, manufactured by Trimble, Inc., Sunnyvale, Calif. A suitable inclinometer for use with the MSSV is an optical inclinometer Model A2T, manufactured by US Digital Corporation, Vancouver, Wash.

Lightning Arrester Module

The lightning arrestor module is a fuse bank for lightning mitigation and it protects all of the communications and power cables on the MSSV. The lightning arrester equipment is contained in the lightning arrester module, which consists of a watertight enclosure that contains surge suppressors for every electrical component on the MSSV.

Battery Module

The battery module consists of a water tight enclosure that houses the batteries, battery management system, and battery chargers. There can be one, or more than one battery module depending on the power needs for the deployment. Preferably, the MSSV is provided with dual battery packs for redundancy and extended run time. In a preferred embodiment, the battery system includes two 48v LiFePO4 battery pack modules. Each battery pack module contains sixteen 3.2v cells, a battery management system, a 3 kw battery charger, and a SAE J1772 charge latch circuit. A battery management system is used to regulate the state of charge and cell to cell balancing of the pack. A controlled area network bus ("CAN BUS") communication is utilized for correlating charge requirements requested by the battery management system ("BMS") to the voltage and current output of the battery charger. An integrated battery heater will maintain optimal temperature for charging. The J1772 circuit provides a safe fault interruptible power supply for the MSSV. The J1772 connection can be used for charging the batteries using the gas powered electric generator in the auxiliary power module. A suitable lithium ion battery management system for use with the MSSV is the Orion Jr. BMS, manufactured by Ewert Energy Systems, Inc., Carol Stream, Ill. A suitable battery charger for use with the MSSV is Model No. 3000W HF/PFC Battery Charger, manufactured by Electric Conversions, Sacramento, Calif.

The MSSV is equipped with large advanced high density battery power packs with integrated power/supply battery charger and battery management system for use underwater as well as a tow behind generator for supplying power on land. The novelty of this approach allows for the MSSV to use electricity supplied from the generator for land transits, which maximizes mission run time for underwater deployments. In a preferred embodiment, the battery pack includes two identical starboard and port modules. Each module is fully self-sufficient with its own battery charger and cell management system, and each module is capable of supplying power for either half of or the entire MSSV with remote control capability.

Auxiliary Power Module

The auxiliary power module includes a trailer, preferably having two wheels and capable of operating in "off road" conditions, with a gas-powered electric generator housed in an enclosure mounted on the trailer. The module can be towed by the MSSV while the generator is plugged into and charging the MSSV. The auxiliary power module increases battery life and the on-site operating time for the MSSV.

Control Module

The MSSV can have one or more control processing unit ("CPU") modules (also referred to herein as a "control module") that contain the computers, communication devices and control electronics for surveying and operating the MSSV. The MSSV is controlled from a remote control unit located on-shore or on a boat that communicates with one or more control devices on board the MSSV. The remote control unit can be separate control devices for operating the electric motor controllers for movement of the MSSV, operation of the survey equipment, and navigation of the MSSV using hydrographic survey software. In a preferred embodiment, all of the control functions are performed through a single computer interface, preferably a tablet computer or lap top computer. However, the number of remote control devices used to operate the MSSV is not intended to limit the scope of the invention. The computer interface communicates with the motor controller(s) mounted in one or more of the enclosures and the survey equipment contained in one or more of the other enclosures via radio frequency or via a wireless network. The computer interface can record the survey data collected by the MSSV and transmit the data in real time to a remote location via radio or a cell phone network. A suitable wireless remote control device is Model No. MCB, manufactured by Cervis, Inc., Warrendale, Pa.

Waterproof Connections

All of the cable and wire connections between the modules and to equipment on the MSSV are run through potted connections, cable glands or waterproof connectors. The waterproof connections prevent the passage of water from one module to another through the conduits. This guarantees that, in the event that the watertight integrity of one of the modules is breached, water will not enter any of the other modules.

Mast Module

The MSSV is equipped with a mast with a mast topper for mounting antennas, sensors, positioning systems and other survey and communications equipment. Preferably, the MSSV has a 26-foot-long mast, which separates into two 13-foot sections made of carbon fiber that can be broken down and transported in an enclosed trailer. Depending on the conditions at the deployment site, both, or only one section of mast may be used. The basis for the selection of the overall mast height is that the mast topper is above water when the submerged MSSV is at its maximum operating depth. Different length masts sections can be used. The length of the mast sections or the overall height of the mast is not intended to limit the scope of the present invention. The MSSV is designed to operate in water depths up to 20 feet. However, greater operational depths can be achieved by increasing the length of the mast. A suitable mast for use with the MSSV is a 26-foot carbon mast manufactured by Hall Composites, Inc., Bristol, R.I.

Survey Instruments Module

The Survey Instruments Module (also referred to herein as the "mast topper") is a structure, typically formed by one or more arms extending perpendicularly to the mast, which is mounted on top of the mast. The mast topper supports wireless vehicle telemetry and control functionality as well as the MSSV's survey sensors and positioning systems. Various communication, monitoring, surveying, measuring and safety equipment can be mounted on the mast topper including: GPS antennas, cameras, laser scanners, Wi-Fi antenna, radio antenna, navigation lights, and spotlights. The MSSV's survey systems include inclinometer sensors and high accuracy GPS systems capable of resolving the MSSV's heading. This design allows the MSSV control system to apply a correction vector for vehicle tilt, allowing the survey system to correctly resolve the terrain's topography. The MSSV can also be equipped with a LiDAR (also called LIDAR, Lidar, and LADAR) system. The name Lidar is an acronym for "Light Detection And Ranging" (also referred to as "Light Imaging, Detection, And Ranging"). LiDAR is a surveying method that measures distance to a target by illuminating that target with a laser light. LiDAR is commonly used to make high-resolution maps. A suitable LiDAR survey system for the MSSV is the Merlin vessel-based LiDAR system, manufactured by Renishaw, PLC, North Yorkshire, United Kingdom. A suitable radio communications antenna for use with the MSSV is Trimble Model No. GA839, manufactured by Trimble Navigation Ltd., Westminster, Colo.

Gin Pole and Winch Stand

A mast extension gin pole and winch can be used to raise and lower the mast. The mast is mounted to a hinged mast base plate on top of the MSSV. After the mast is raised, a pin is inserted in the hinged mast base plate to lock it into place. To facilitate raising the mast, the gin pole is attached to the base plate perpendicular to the mast. A cable is attached from the gin pole to a bracket on the mast, and a winch strap is attached to the gin pole. The mast can then be raised by cranking a winch mounted to the winch stand at the stern of the MSSV. In a preferred embodiment, the MSSV is provided with a hydraulic powered, self-erecting mast.

Referring to the drawings to describe specific embodiments of the MSSV, FIGS. 1-9 show different views of a preferred embodiment of the MSSV 10. As shown in FIG. 1, the MSSV 10 has an exterior shell 12 formed by a center section 14, a bow wedge-shaped section 16 and a stern wedge-shaped section 18. The center section 14 has a top wall 20 that extends between a port side wall 22 and a starboard side wall 24. The MSSV 10 has two continuous tracks—a port track 26 and a starboard track 28—that allow the MSSV to move forward and backward and to turn left or right. A mast 30 extends upwardly from a hinged mast base plate 32 and a mast topper 34 (see FIG. 6) at the top of the mast 30 provides a platform for various devices. A gin pole 36 is attached to the hinged mast base plate 32 at approximately a right angle (i.e., 90 degrees) and in combination with a winch stand 38 extending from the stern, the gin pole 36 is used to raise and lower the mast 30.

Figure 2:
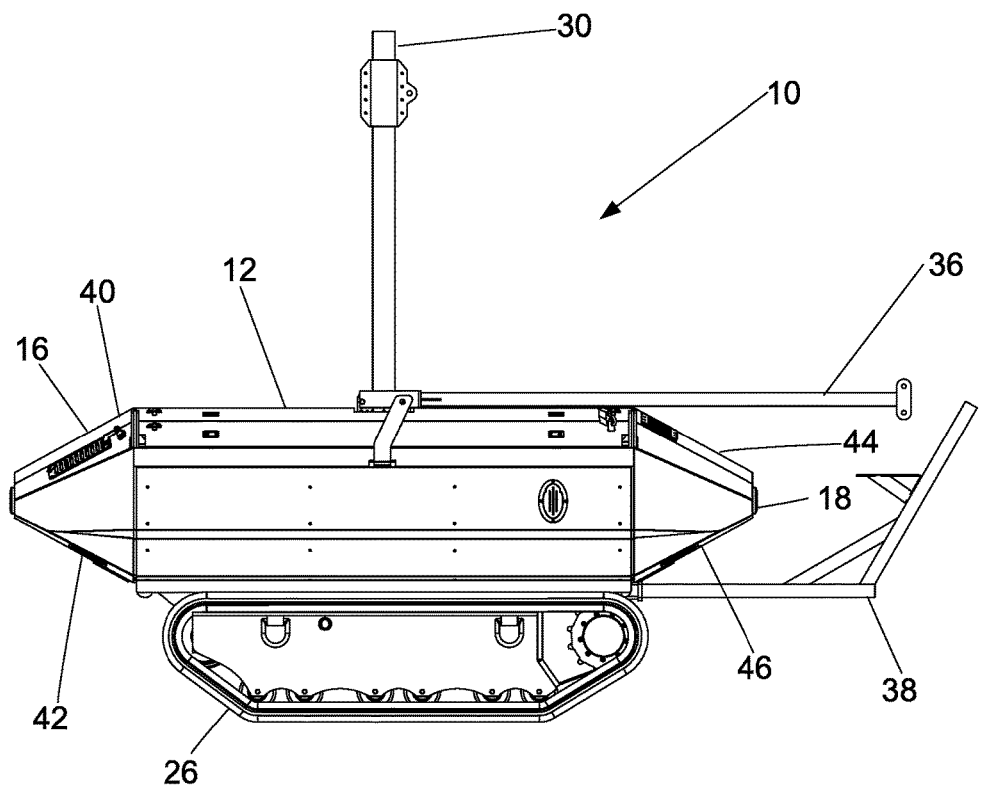
FIG. 2 is a left side view of the modular submersible survey vehicle shown in FIG. 1.

FIG. 2 shows the left (port) side of the MSSV 10 and illustrates how the bow wedge-shaped section 16 is formed by a top surface 40 that slopes downwardly and by a bottom surface 42 that slopes upwardly at an angle (a). Similarly, the stern wedge-shaped section 18 is formed by a top surface 44 that slopes downwardly and by a bottom surface 46 that slopes upwardly. The top surfaces 40, 44 and bottom surfaces 42, 46 of both the bow wedge-shaped section 16 and the stern wedge-shaped section 18 slope at an angle (a) of from 20 degrees to 40 degrees, preferably 30 degrees. The configurations of the bow wedge-shaped section 16 and the stern wedge-shaped section 18 provide the MSV with a hydrodynamic shape that facilitates the movement of the MSSV 10 in the surf.

Figure 3:
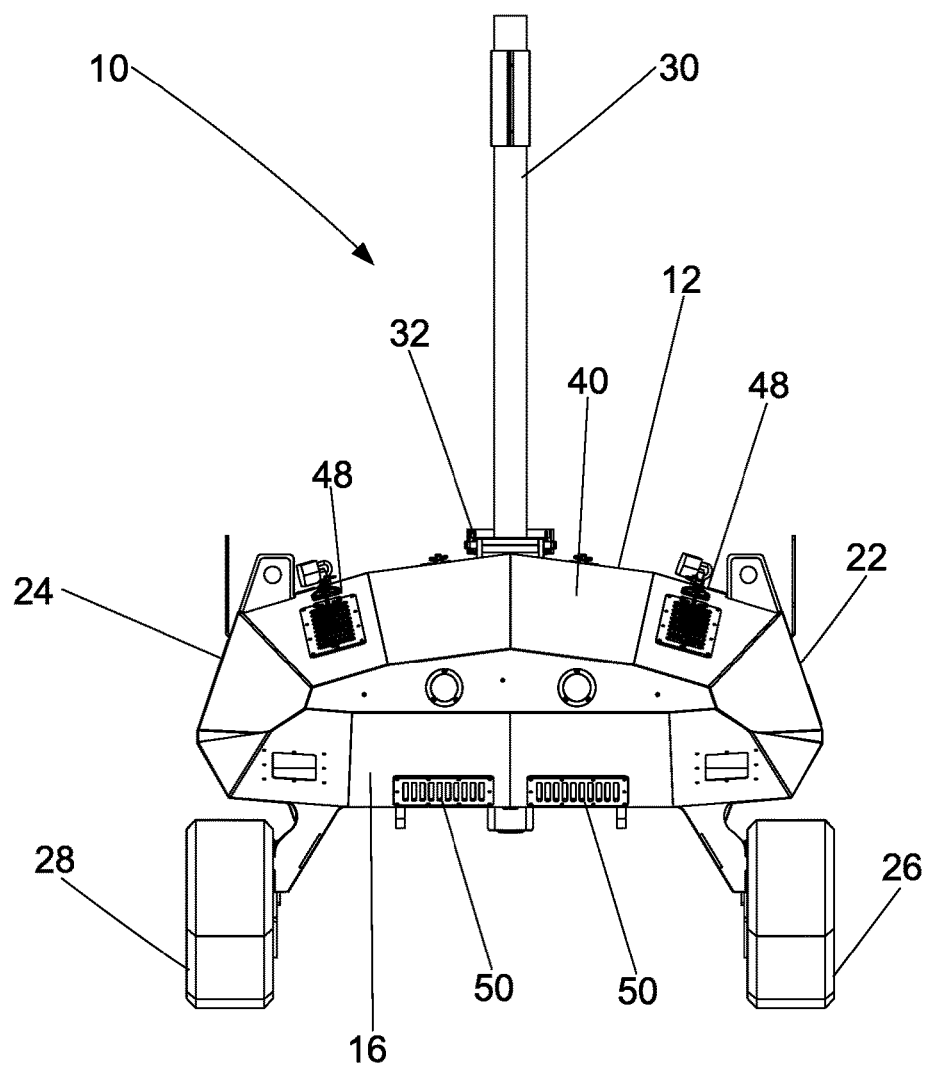
FIG. 3 is a front view of the modular submersible survey vehicle shown in FIG. 1.

FIG. 3 shows a front (bow) view of the MSSV 10 with port and starboard tracks 26, 28 and a bow wedge-shaped section 16 having a sloping top surface 40 with a pair of vents 48 and a sloping bottom surface 42 with a pair of vents 50. When the MSSV 10 enters a body of water and the water flows into the interior through the chassis and the vents 50 on the bottom surface 42, the vents 48 on the top surface 40 allow the air in the interior to escape so that the water freely flows into the interior.

Figure 4:
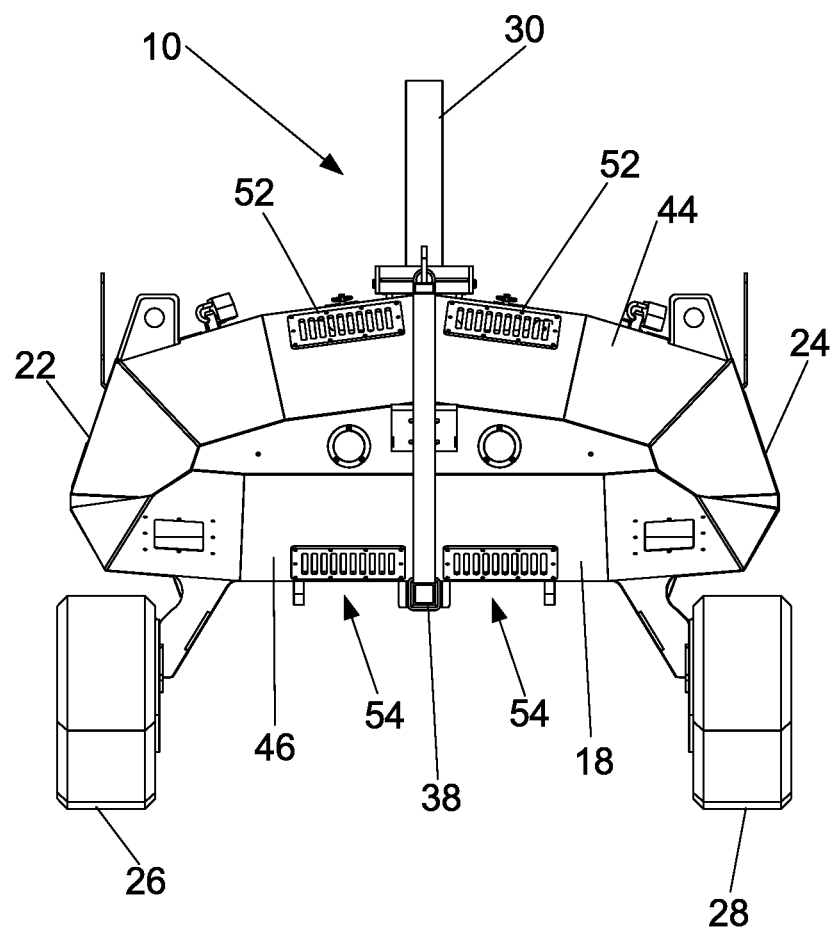
FIG. 4 is a rear view of the modular submersible survey vehicle shown in FIG. 1.

FIG. 4 shows a rear (stern) view of the MSSV 10 with port and starboard tracks 26, 28 and a stern wedge-shaped section 18 having a sloping top surface 44 with a pair of vents 52 and a sloping bottom surface 46 with a pair of vents 54. The vents 54 on the bottom surface 46 allow water into the interior and the vents 52 on the top surface 44 allow the air to escape from the interior. FIG. 4 shows how the winch stand 38 extends from the stern of the MSSV 10.

Figure 5:
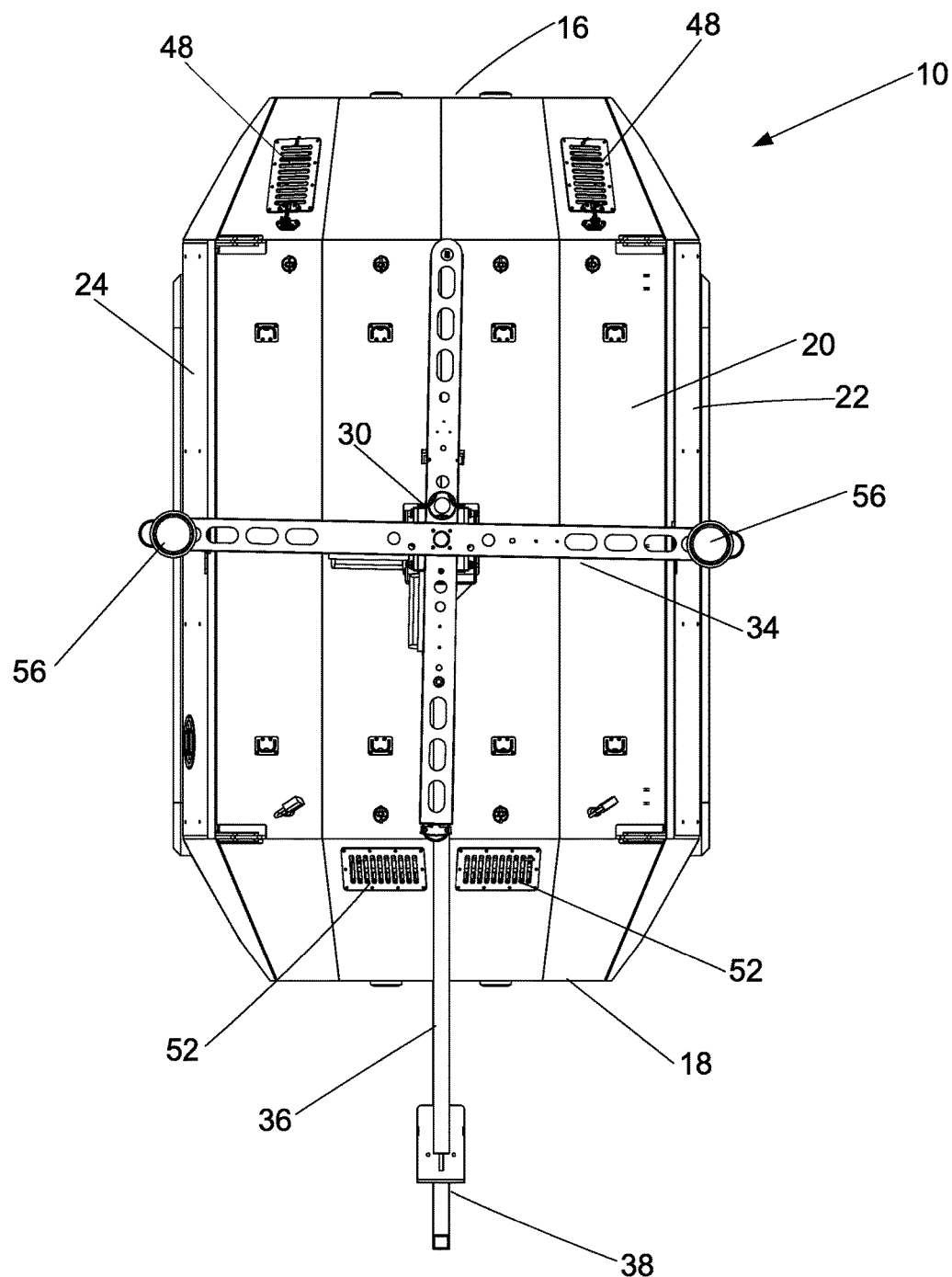
FIG. 5 is a top view of the modular submersible survey vehicle shown in FIG. 1.
Figure 6:
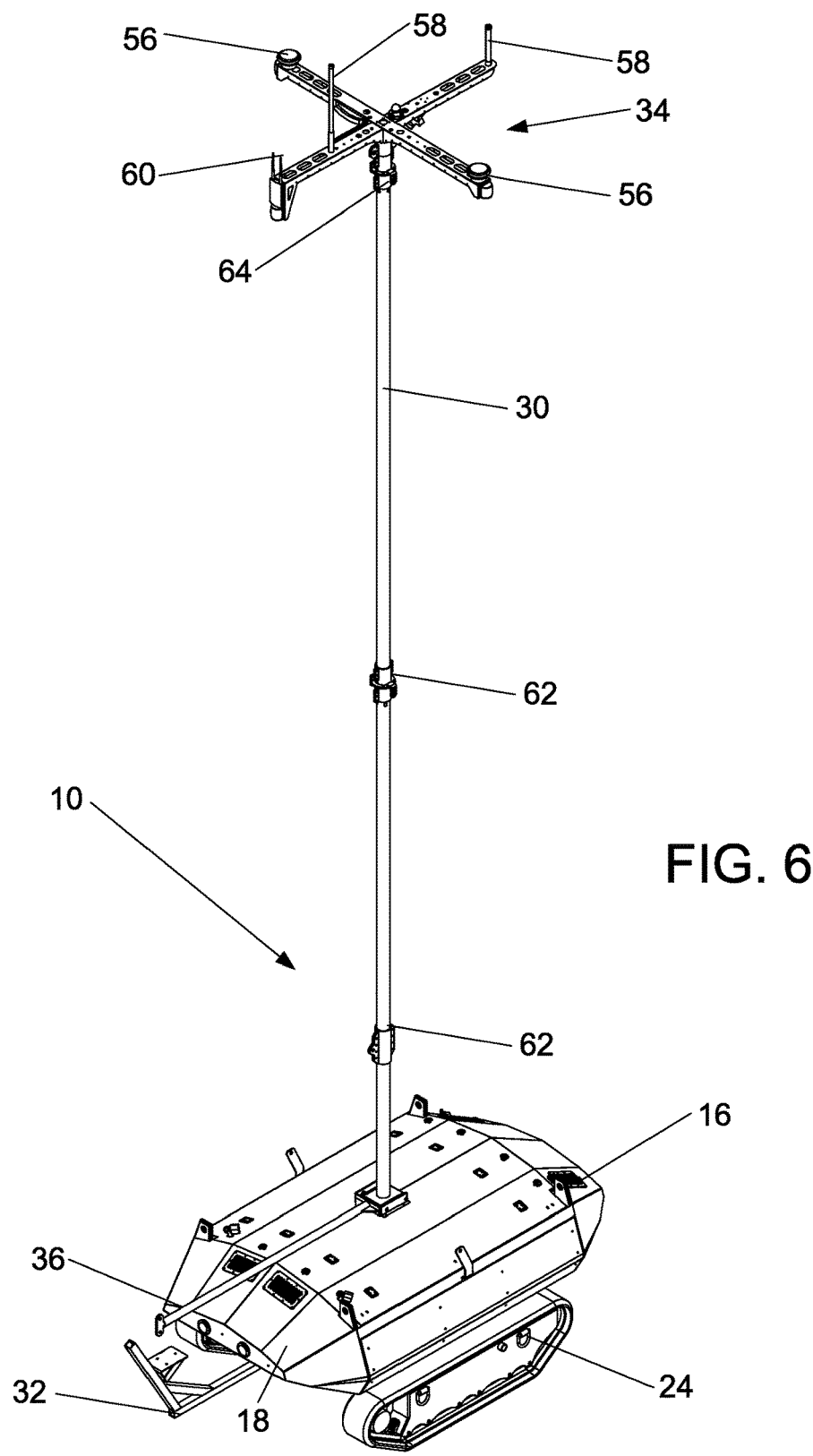
FIG. 6 is a peripheral rear view of the modular submersible survey vehicle shown in FIG. 1 with a mast and a mast head topper.

FIG. 5 is a top view of the MSSV 10 and it shows the bow wedge-shaped section 16 with the vents 48 on the top surface 40 and the stern wedge-shaped section 18 with the vents 52 on the top surface 44. The mast 30 extends upwardly from the center of the top wall 20 to the mast topper 34, which supports two GPS antennas 56. FIG. 6 shows the mast topper 34 in more detail with the two GPS antennas 56, two radio antennas 58 and a WiFi antenna 60. Two collars 62 connect sections of the mast 30 together and a third collar 64 attaches the mast topper 34 to the mast 30.

Additional mast sections can be added depending on the depth of the water in which the MSSV 10 is operating.

Figure 7:
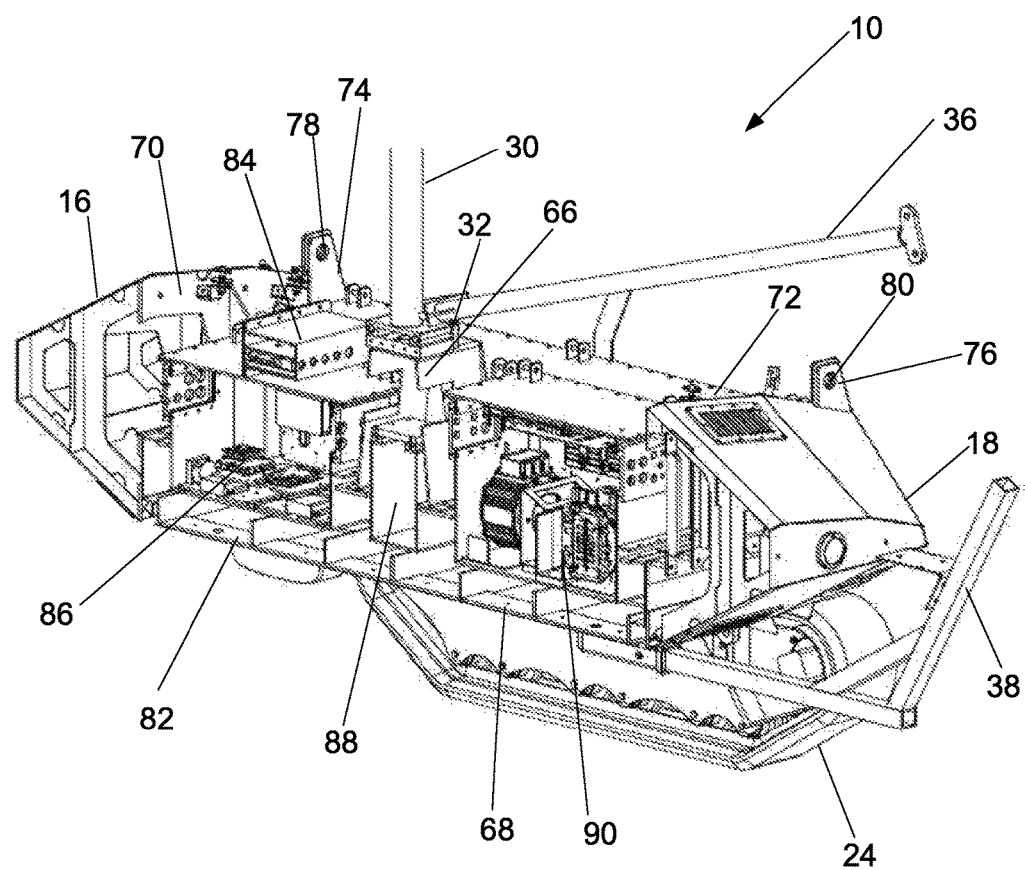
FIG. 7 is a peripheral view of the left side of the modular submersible survey vehicle shown in FIG. 1 with the port side wall and top wall of the shell removed.

FIG. 7 is a sectional view of the MSSV 10 with the portside of the MSSV 10 removed. The mast 30 is attached to the hinged mast base plate 32 which is attached to the mast support structure 66 that is formed as part of the chassis 68. The chassis 68 extends from a bow bulkhead 70 to a stern bulkhead 72 and each bulkhead 70, 72 has a pair of members 74, 76 with apertures 78, 80 that are used for lifting the MSSV 10. The interior 82 of the MSSV 10 contains watertight modules that contain different mechanical and electrical components including the lightning arrester module 84, the control processing unit ("CPU") module 86, the hydraulic fluid reservoir module 88 and the hydraulic pump unit ("HPU") module 90.

Figure 8:
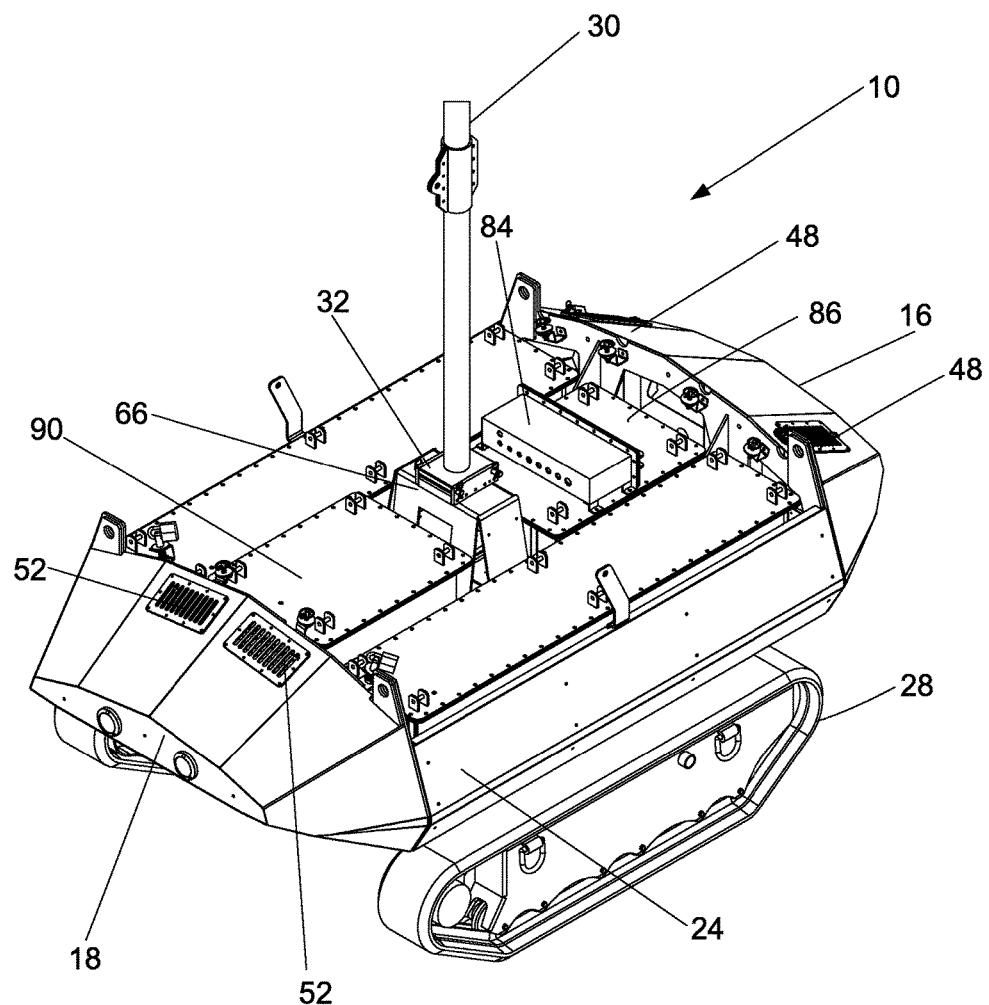
FIG. 8 is a peripheral view of the right side of the modular submersible survey vehicle shown in FIG. 1 with the top wall of the shell removed.
Figure 9:
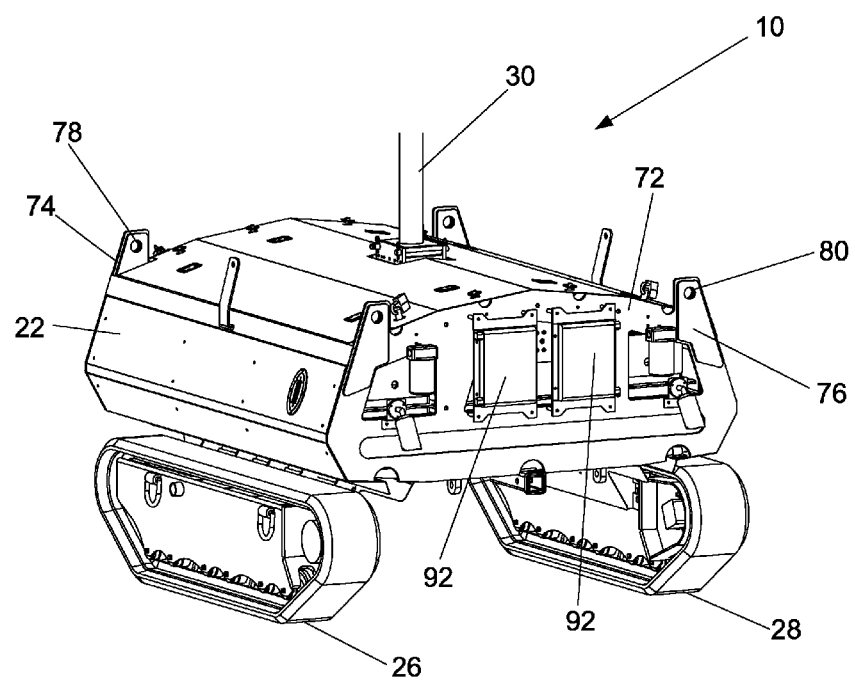
FIG. 9 is a peripheral rear view of the modular submersible survey vehicle shown in FIG. 1 with the stern wedge-shaped section removed.

FIG. 8 shows the MSSV 10 with the top wall 20 of the shell 12 removed. The lightning arrester module 84 is mounted above the CPU module 86, forward of the mast support structure 66. The HPU module 90 is mounted on the stern side of the mast support structure 66. FIG. 9 shows the MSSV 10 with the bow and stern wedge shaped sections 16, 18 of the hull 12 removed to expose the stern bulkhead 72. Mounted on the stern bulkhead 72 are two radiators 92 that are used for cooling the hydraulic fluid. The radiators 92 are cooled by the ambient air or by water when the MSSV 10 is submerged. The bow and stern wedge shaped sections 16, 18 can be easily removed and reattached to facilitate repairs or to reduce the size of the MSSV 10 for shipment or storage.

Figure 10:
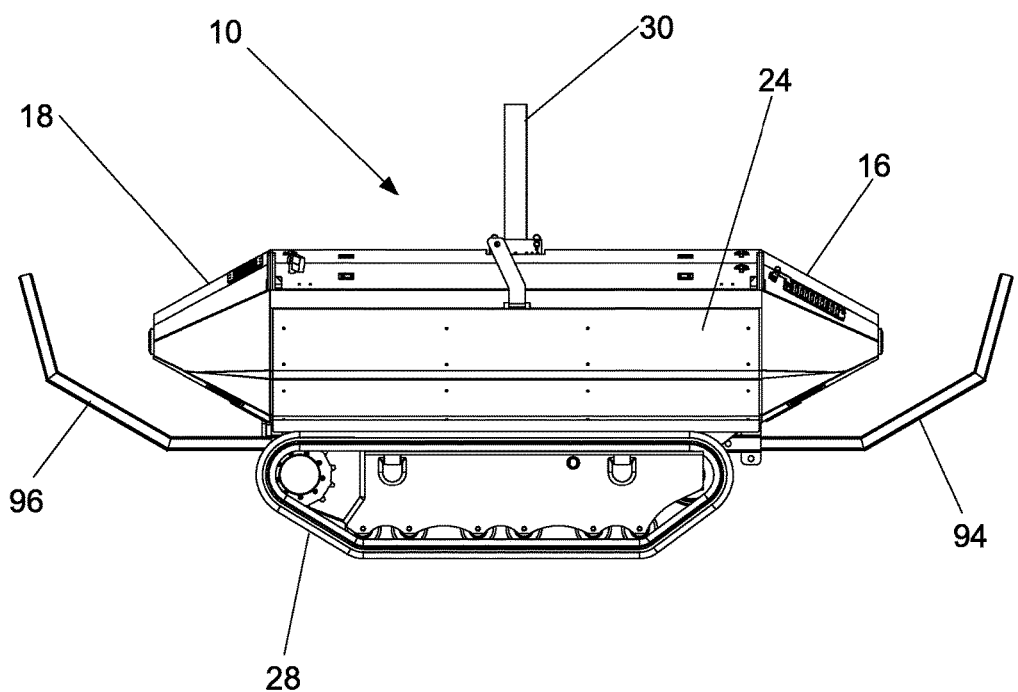
FIG. 10 is a right side view of another embodiment of the modular submersible survey vehicle with bow and stern roll bars.
Figure 11:
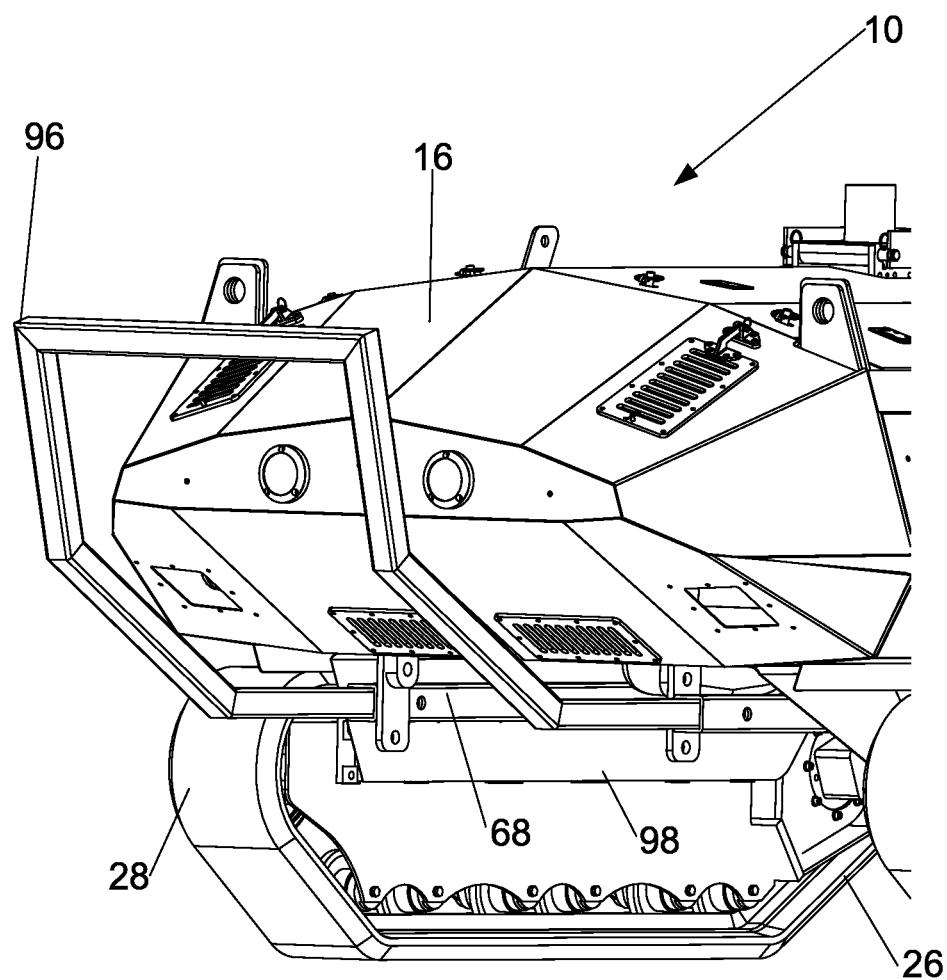
FIG. 11 is a peripheral front view of the modular submersible survey vehicle shown in FIG. 10.

FIG. 10 shows a side view of an embodiment of the MSSV 10 with roll bars 94, 96 attached to the bow and stern. The roll bars 94, 96 prevent the MSSV 10 from rolling over in rough surf or when operating on irregular bottom surfaces. FIG. 11 shows the bow roll bar 94 and it includes a pair of U-shaped members that are attached to the chassis 68 and extend outwardly and upwardly to join together and form the base of the U-shaped member. FIG. 11 also shows a skid plate 98 that is attached to the chassis 68 near the bow bulkhead 70 and extends downwardly and towards the stern of the MSSV 10. The skid plate 98 deflects obstacles that are encountered by the MSSV 10 and minimizes the amount of sand, rocks and debris that passes into the interior 82 of the MSSV 10 through the open structure of the chassis 68.

Figure 12:
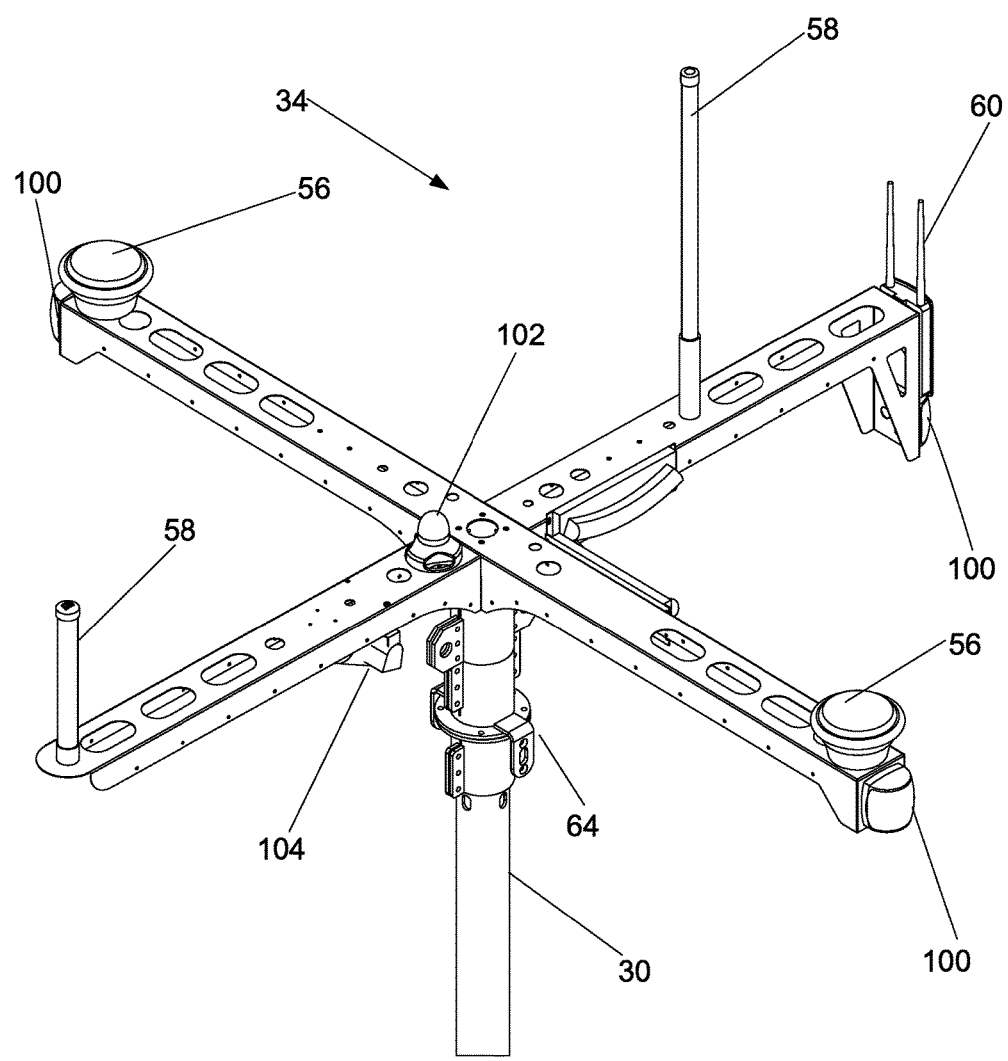
FIG. 12 is a peripheral view of the mast topper.

FIG. 12 is an embodiment of the mast topper 34 with two GPS antennas 56, two radio antennas 58, a WiFi antenna 60, three navigation lights 100, an anchor light 102 and a camera 104. One skilled in the art would understand that the equipment mounted on the mast topper 34 can change depending on the specific requirements of a project and that the equipment shown in FIG. 12 does not limit the scope of the present invention.

Figures 13, 14:
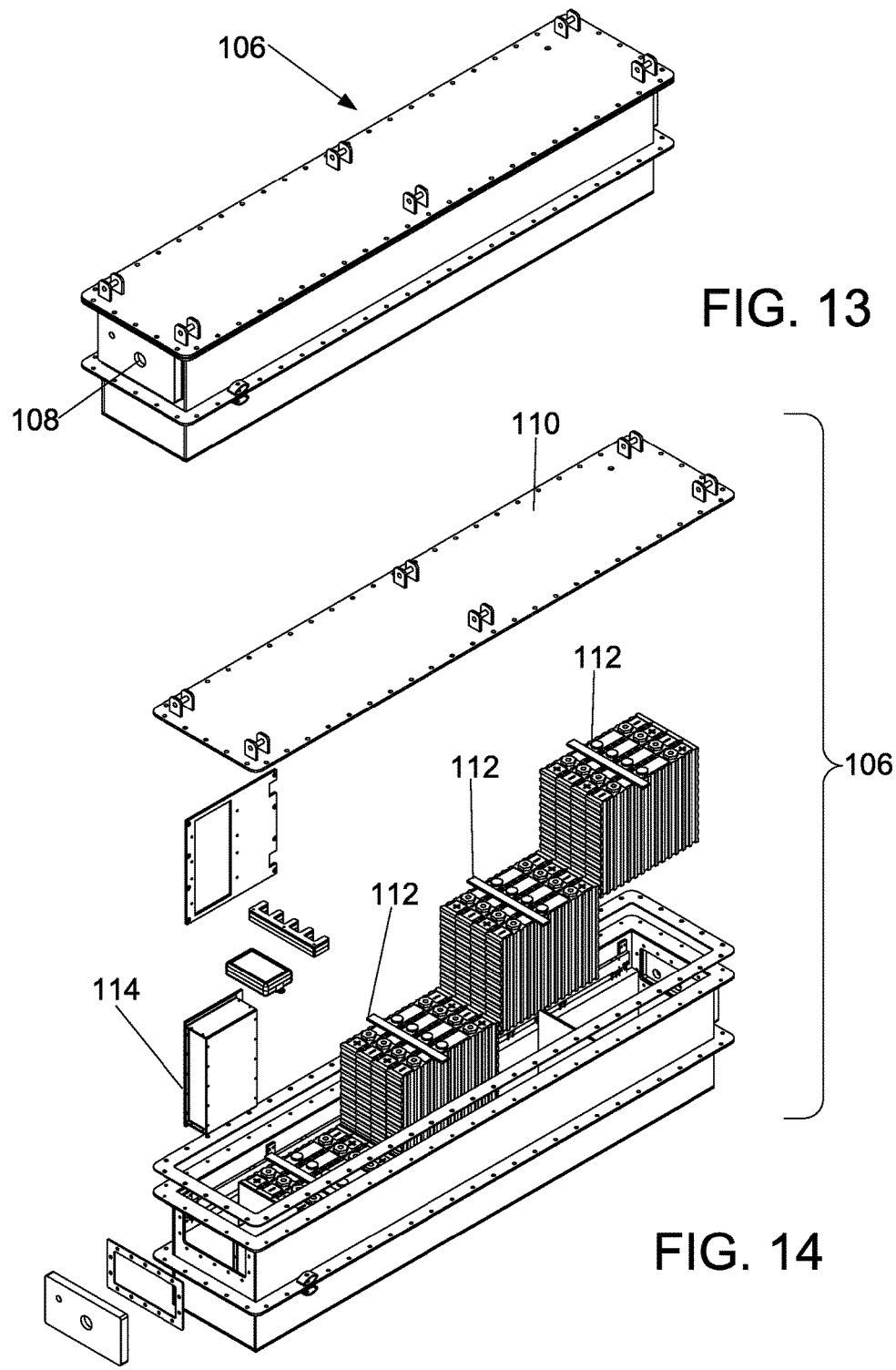
FIG. 13 is a peripheral side view of the battery module.
FIG. 14 is an exploded side view of the battery module.

FIGS. 13 and 14 show the battery module 106. FIG. 13 shows the battery module 106 in sealed, watertight configuration with a fitting 108 at one end for connecting a watertight conduit (not shown). FIG. 14 shows an exploded view of the battery module 106 with the cover 110 removed and the different batteries 112, 114 outside the module 106. The batteries 112, 114 are used for the lights 100, 102, the variable speed electric motors 118 that power the hydraulic pumps 120, the CPU, the communication equipment and the surveying equipment.

Figure 15:
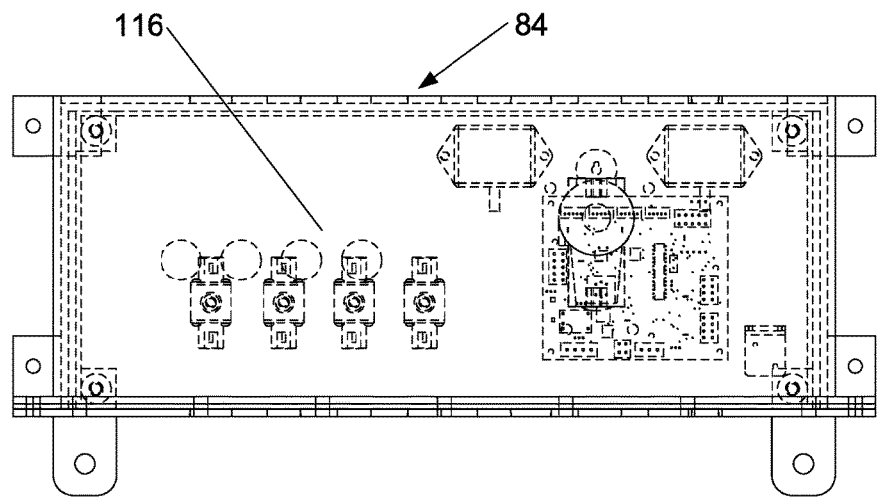
FIG. 15 is a top view of the lightning arrestor module.
Figure 16:
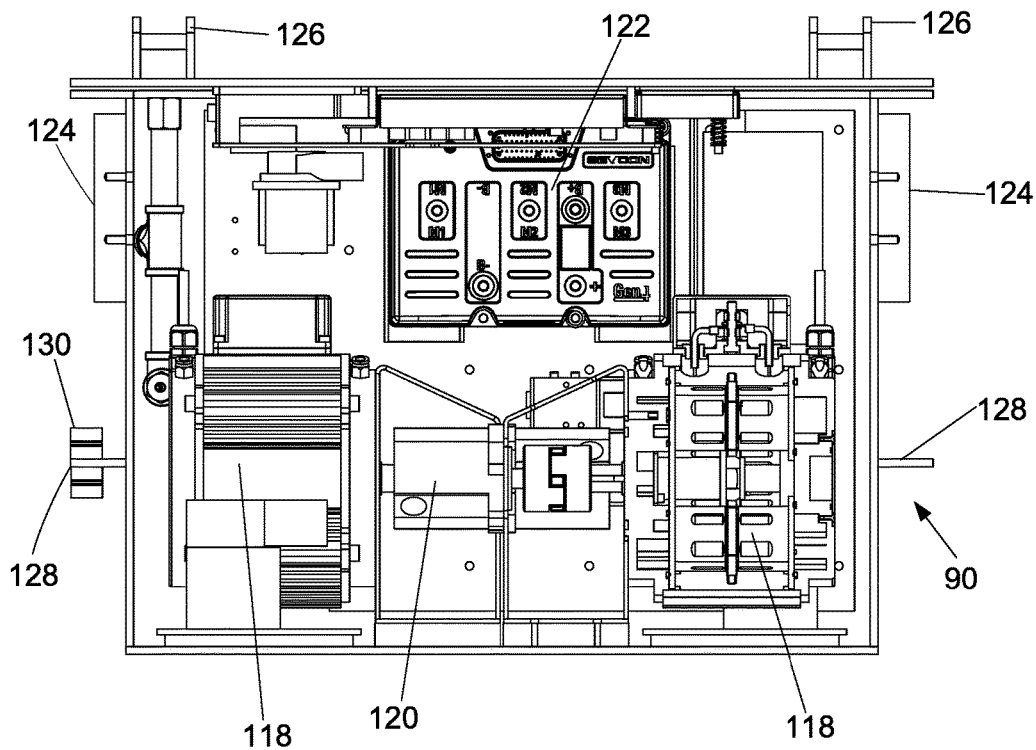
FIG. 16 is a top view of the hydraulic power unit module.
Figure 17:
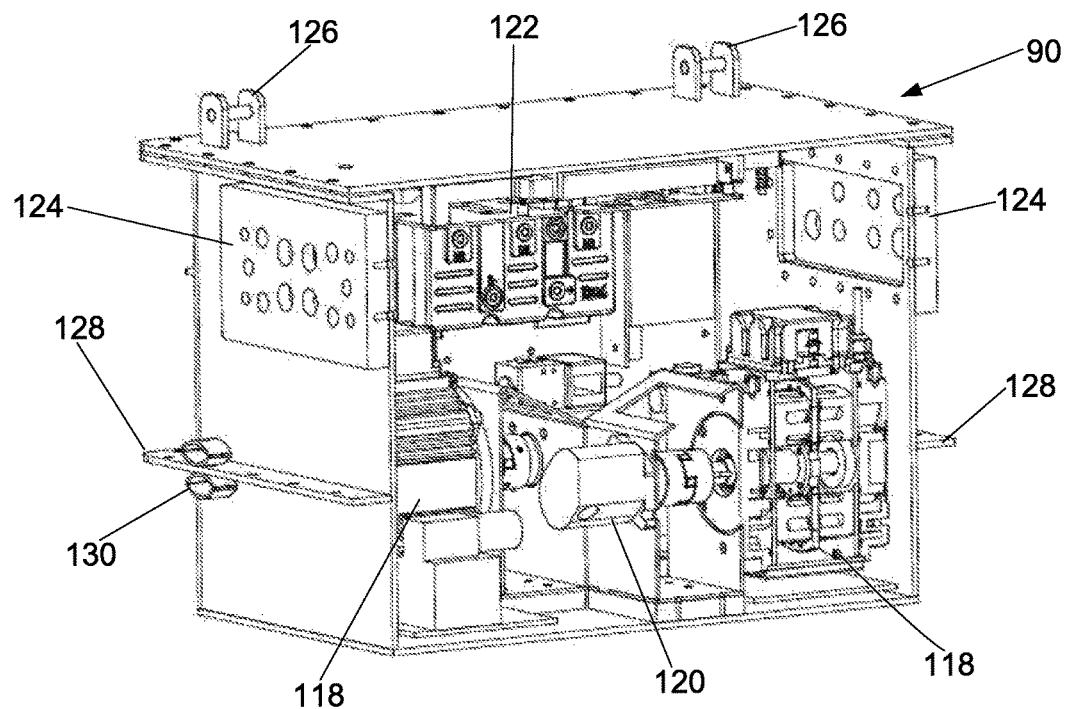
FIG. 17 is a peripheral side view of the hydraulic power unit module with a side wall removed.
Figure 18:
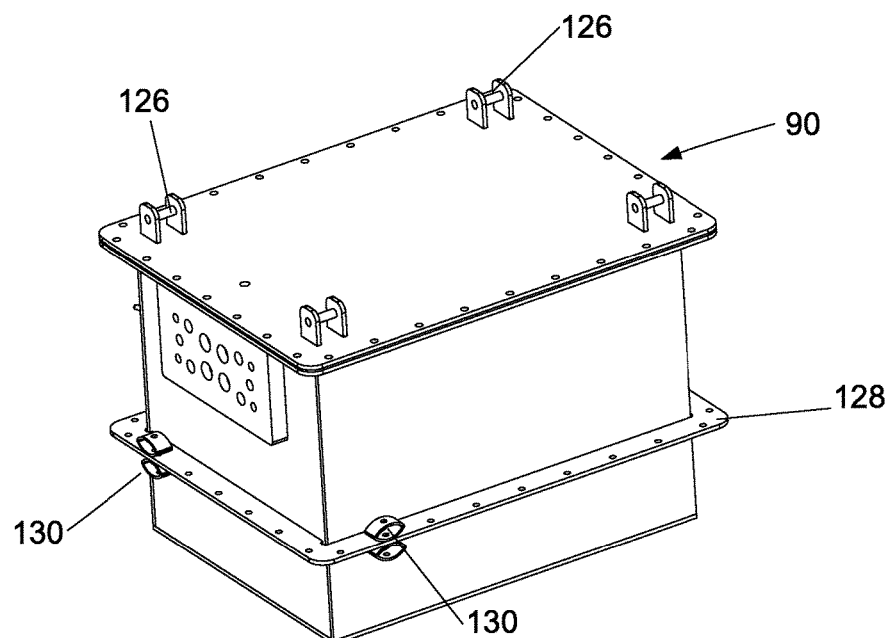
FIG. 18 is a peripheral side view of the sealed hydraulic power unit module.

FIG. 15 shows the lightning arrester module 84, which houses the electrical components for the lightning arrester circuits. FIGS. 16 and 17 show a side and peripheral view of the HPU module 90 with a side wall removed. FIG. 18 shows the HPU module 90 sealed closed and ready to be installed in the MSSV 10. The HPU module 90 contains two electrical motors 118 and two hydraulic pumps 120 that drive the tracks 26, 28, along with the motor controls 122. The power to the electric motors 118 can be varied to control the speed of the MSSV 10. The hydraulic lines and electric cables are connected to the module 90 through a plurality of watertight fittings 124 in the wall. Two or more lifting members 126 are located on the top of the module 90 and are used for installing and removing the module 90 from the chassis 68. Flat members 128 with a plurality of apertures are attached to the outside walls of the module 90 and are used to attach the module 90 to the chassis 68. Rubber bumpers 130 are placed between the flat members 128 and the chassis 68 to act as shock absorbers and minimize the impact when the MSSV 10 passes over uneven surfaces.

Figure 19:
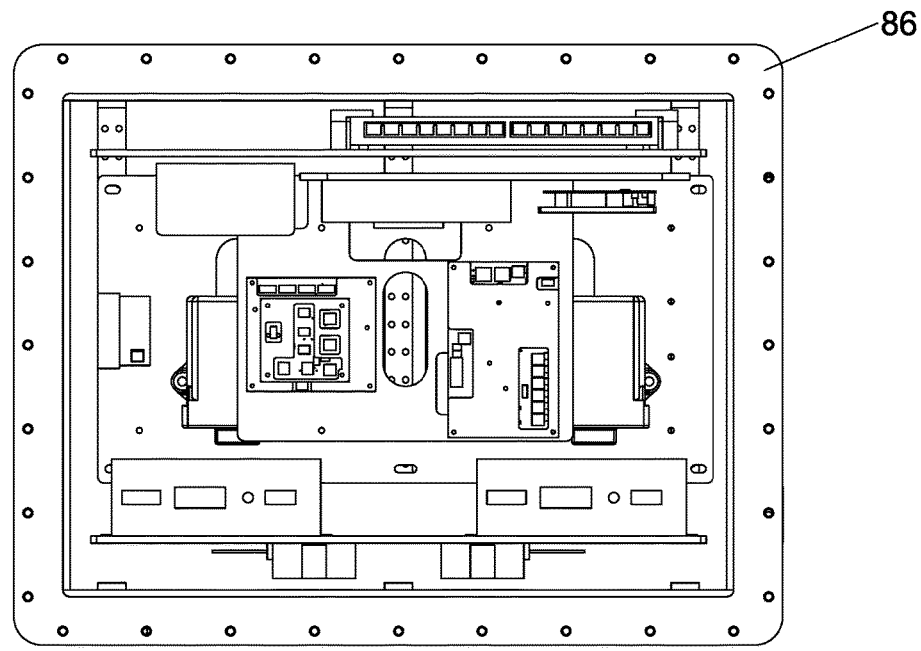
FIG. 19 is a top view of the control processing unit module with the top removed.

FIG. 19 shows the control processing unit ("CPU") module 86, which contains one or more processors for controlling the movement of the MSSV, the GPS electronics, the radio communication equipment and the survey and sampling equipment. Depending on the amount of electronic equipment and processors required for a project, the MSSV 10 can have more than one CPU module 86. The number of CPU modules 86 and the distribution of electronic equipment and processors in the CPU modules are not intended to limit the scope of the invention in any way.

Figure 20:
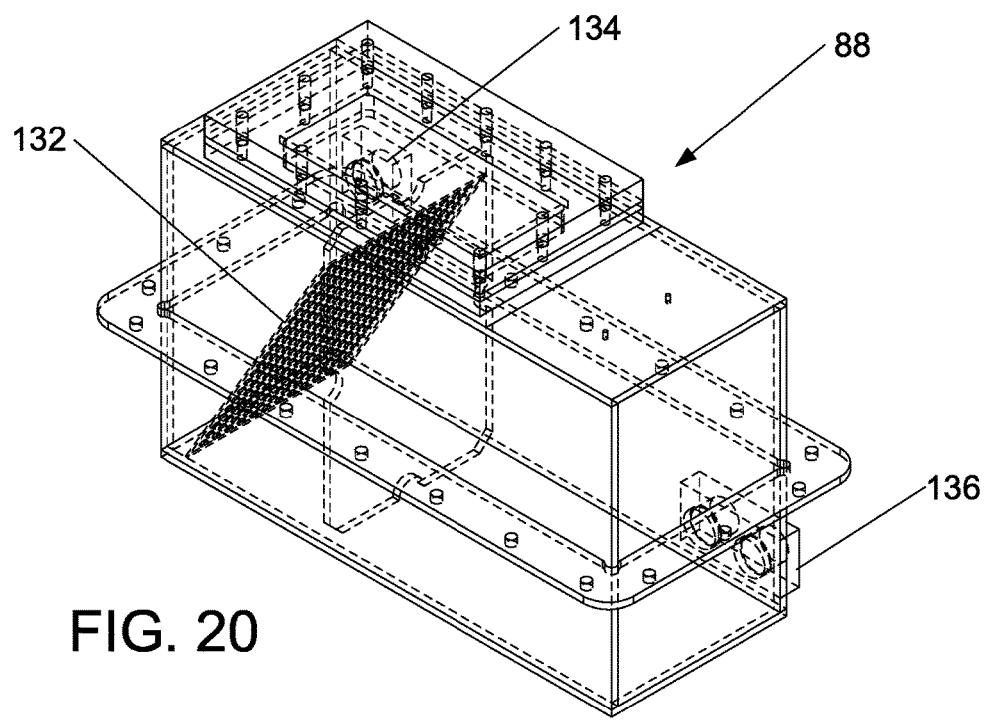
FIG. 20 is a peripheral side view of the hydraulic fluid reservoir.
Figure 21:
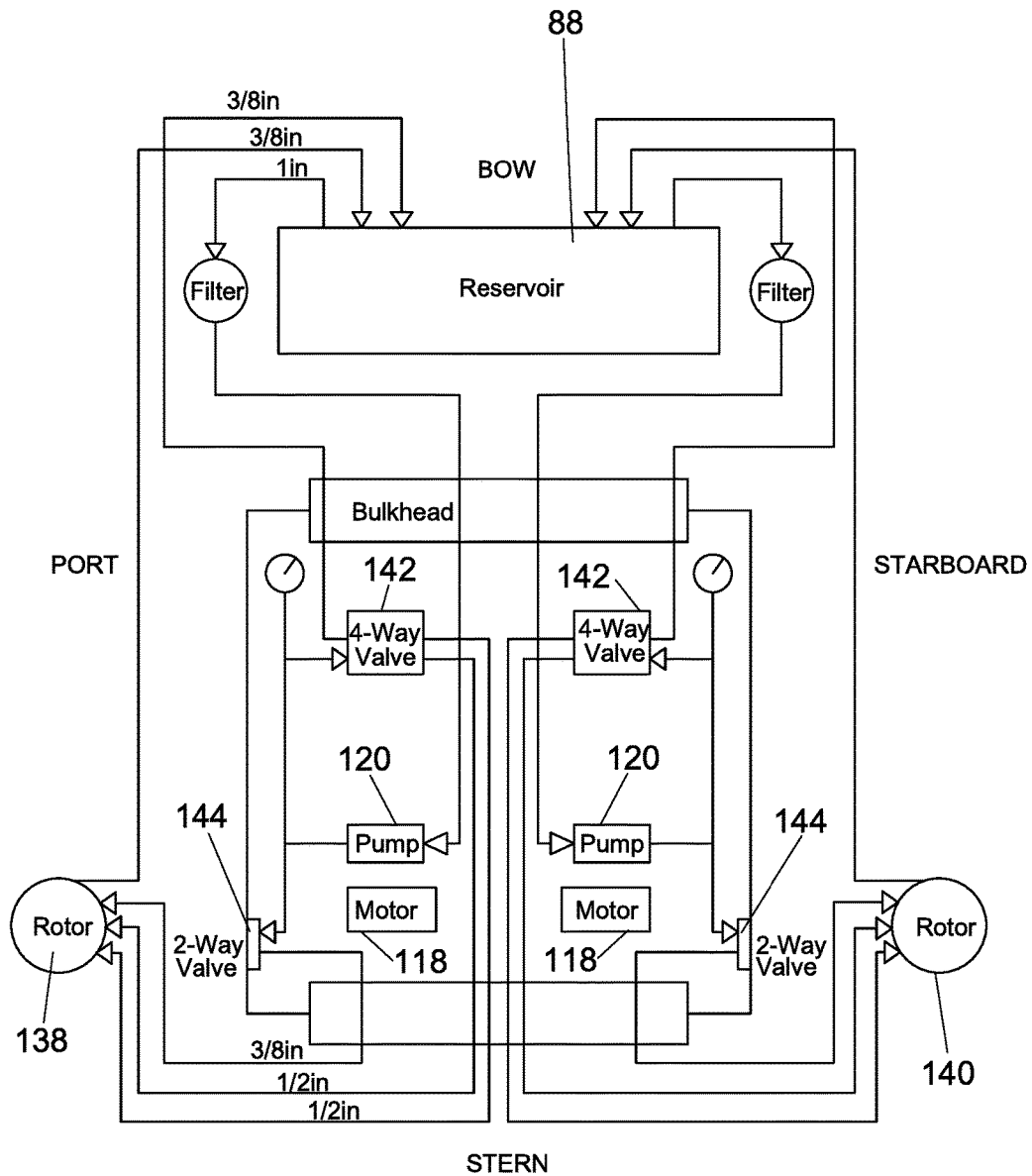
FIG. 21 is a schematic diagram of the hydraulic fluid system that operates the tracks.

FIG. 20 shows the sealed hydraulic fluid reservoir module 88, which contains the hydraulic fluid for the hydraulic pumps 120 and a filter 132 for removing any particulates from the fluid. Inlet connections 134 on one side of the filter 132 receive the hydraulic fluid, which passes through the filter 132 and is connected to the two hydraulic pumps 120 by a pair of connections 136 on the side of the module 88. FIG. 21 shows a schematic for the hydraulic lines. The hydraulic fluid is pumped to a rotor 138 that actuates the port track 26 from one of the hydraulic pumps 120 and to a rotor 140 that actuates the starboard track 28 from the other hydraulic pump 120. The rotors 138, 140 have a plurality of ports (i.e., connections) connected to the hydraulic fluid lines. The tracks 26, 28 of the MSSV 10 move forward when valves 142, 144 in the hydraulic lines are in a first position that sends hydraulic fluid through a first line to a first port on each rotor 138, 140 and vents fluid through another port. The tracks 26, 28 of the MSSV move in reverse when the valves 142, 144 are switched to a second position that sends hydraulic fluid through a second line to a second port on each rotor 138, 140 and vents fluid through another port. The MSSV 10 can move to port or starboard by varying the speed of one of the electric motors 118 that operates the hydraulic pumps 120. Decreasing the speed of one of the motors 118, while maintaining the speed of the second motor 118, causes one track 26 or 28 to move more slowly and results in the MSSV 10 moving in the direction of the slower track 26 or 28.

Figure 22:
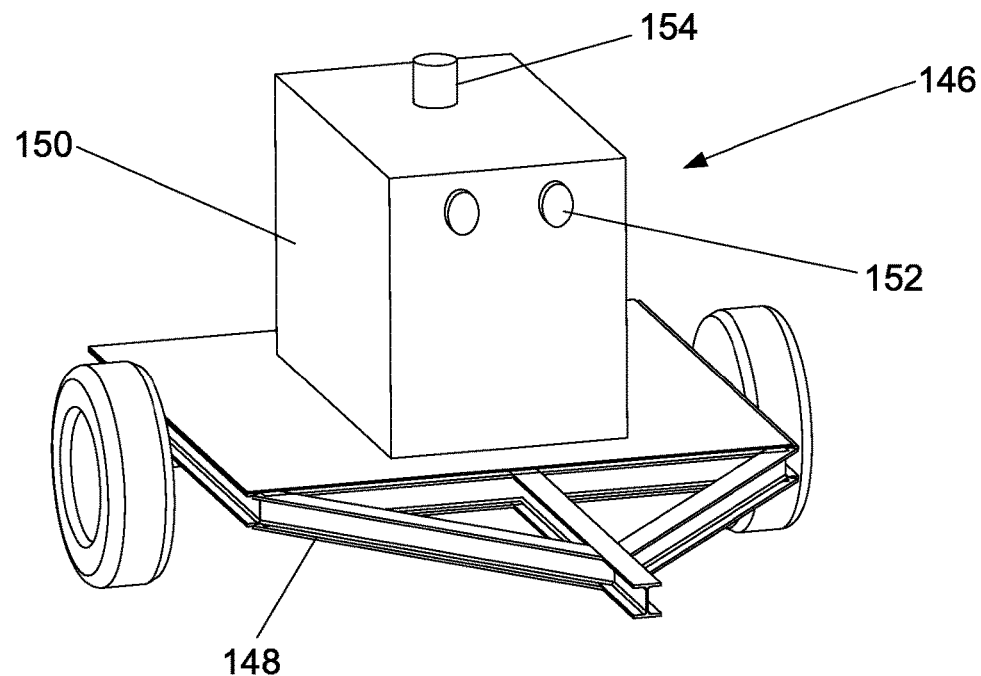
FIG. 22 is a peripheral front view of the auxiliary electrical generator module.
Figure 23:
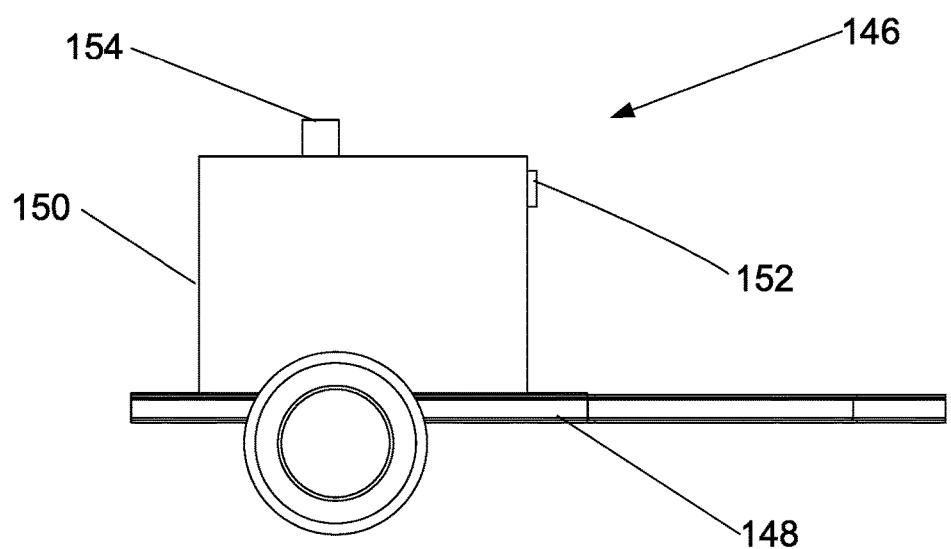
FIG. 23 is a side view of the auxiliary electrical generator module shown in FIG. 22.

FIGS. 22 and 23 show an auxiliary electrical generating unit 146 that is attached to the rear of the MSSV 10 when it is on dry land or very shallow water and is used to recharge the batteries 112, 114. The auxiliary electrical generating unit 146 includes a trailer 148 with a water resistant enclosure 150 that houses a gasoline powered electrical generator (not shown) and converters to provide the power requirements to recharge the batteries 112, 114. The enclosure 150 has electrical connections 152 that are used to connect the electrical generator to the MSSV 10. The enclosure is also provided with a vent 154 for the exhaust gas from the generator. The auxiliary electrical generating unit 146 allows the batteries 112, 114 of the MSSV 10 to be recharged while the MSSV 10 is moving from one location to another so that it does not have to be tethered to a stationary recharging facility. The auxiliary electrical generating unit 146 reduces the down time for the MSSV 10 so that projects can be completed more quickly.

Figure 24:
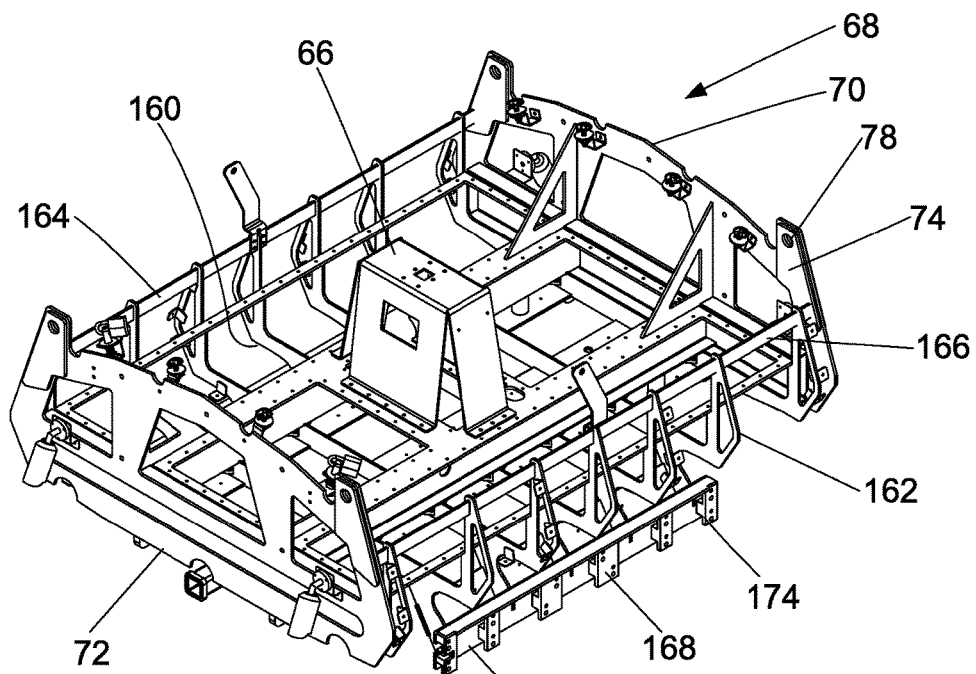
FIG. 24 is a top peripheral rear view of the chassis of an embodiment of the modular submersible survey vehicle.
Figure 25:
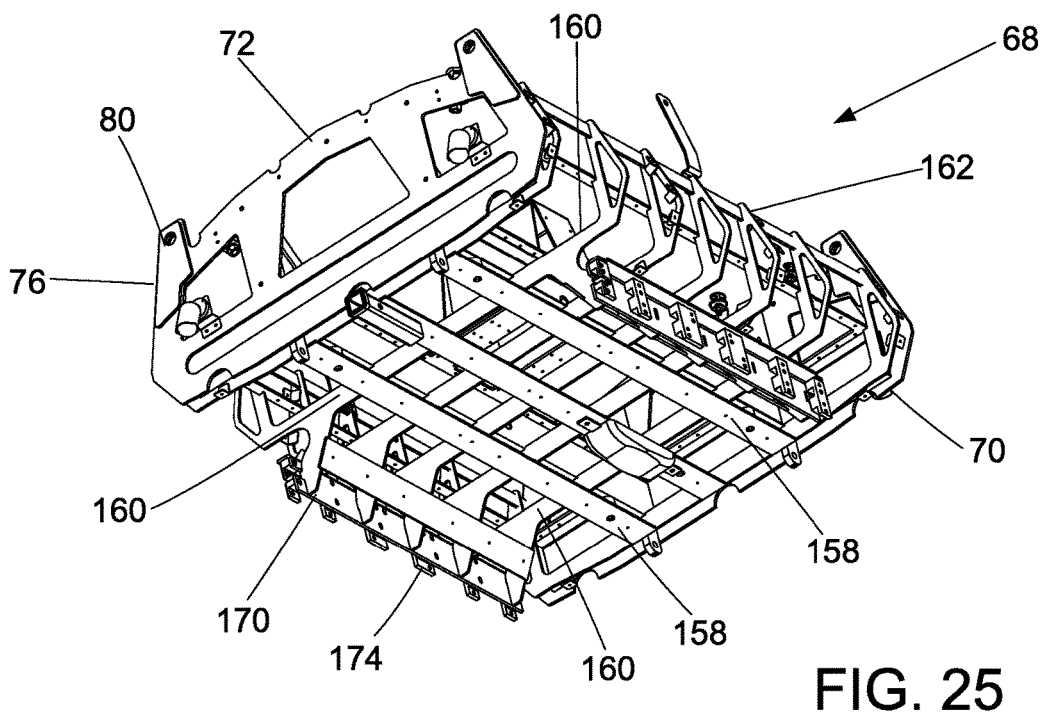
FIG. 25 is a bottom peripheral rear view of the chassis of the modular submersible survey vehicle shown in FIG. 24.
Figure 26:
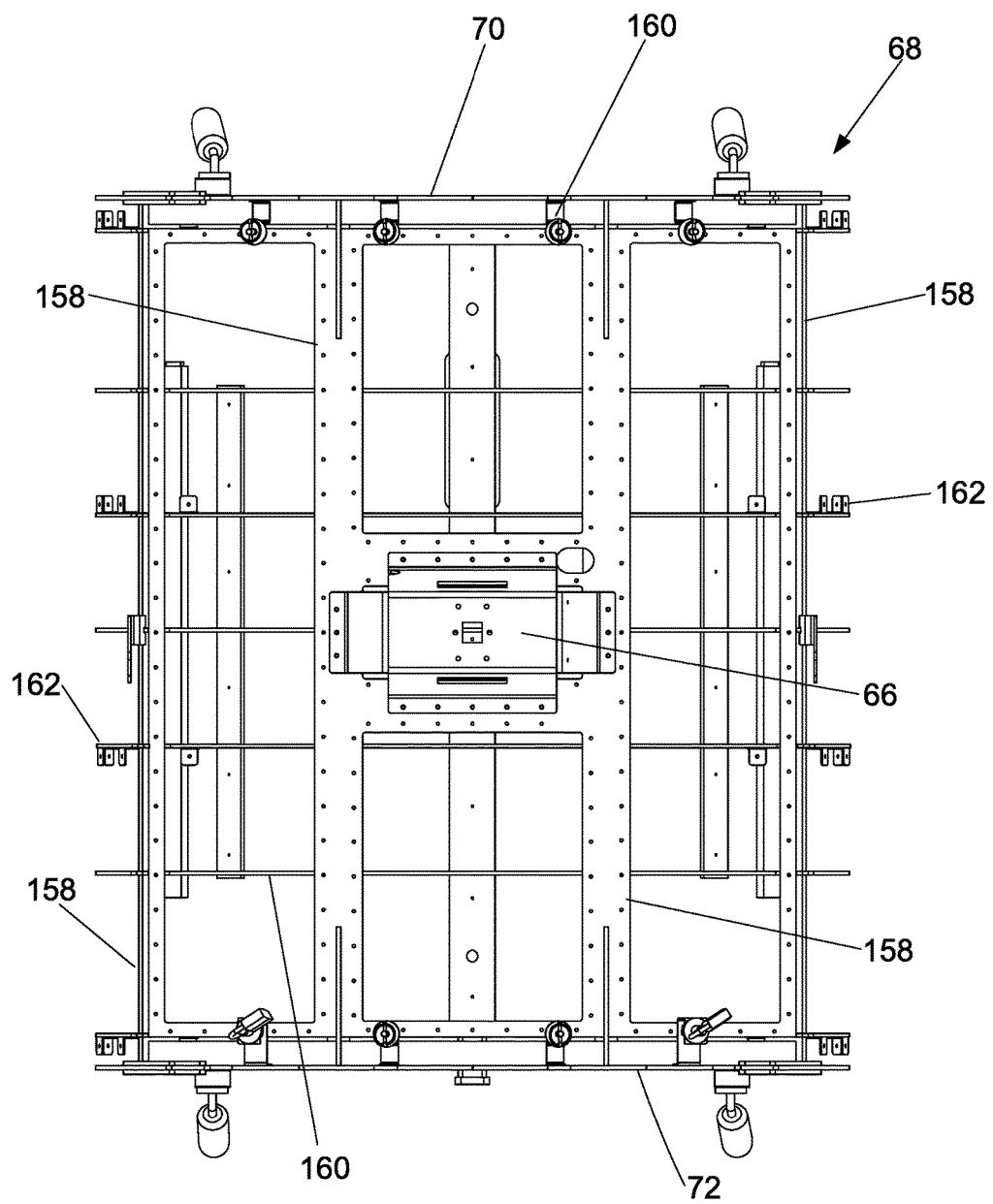
FIG. 26 is a top view of the chassis of the modular submersible survey vehicle shown in FIG. 24.

FIGS. 24 and 25 show the top and bottom perspective views, respectively, of the chassis 68 of the MSSV 10. FIG. 26 shows a top view of the chassis 68. The chassis 68 has an open frame structure and is formed by a plurality of elongated members 158 that extend parallel to the longitudinal axis of the chassis 68 between the bow bulkhead 70 and the stern bulkhead 72 and form the bottom of the chassis 68. A plurality of transverse ribs 160 are attached to the plurality of elongated members 158 at intervals between the bow bulkhead 70 and the stern bulkhead 72. A brace 162 extends upwardly from either end of each of the plurality of transverse ribs 160 and connects to a port side elongated member 164 and a starboard side elongated member 166, respectively. The braces 162 preferably have an arcuate shape that extends outwardly from the chassis 68 so that, when the side walls 22, 24 are attached, they have a curved surface. The plurality of elongated members 158 and the plurality of transverse ribs 160 of the chassis 68 form a lattice structure through which water can freely flow into and out of the MSSV 10. Rails 168, 170 are attached to the bottom of the chassis 68 on the port and starboard sides. Each rail has a plurality of attachment points 174 that are used to attach the chassis 68 to the tracks 26, 28.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A modular submersible survey vehicle (MSSV) comprising:
   a pair of continuous tracks;
   a chassis mounted on the pair of continuous tracks, wherein the chassis has a longitudinal axis extending between a first end and a second end, first and second sides, a top side, and a bottom side, and wherein the chassis has an open frame structure that allows water to freely pass through;
   a shell attached to the chassis and comprising a top wall extending between first and second side walls on the first and second sides of the chassis, the top wall and side walls define an interior and an open bottom portion, wherein the shell comprises one or more vents; and
   a plurality of watertight modules mounted on the chassis, wherein the modules contain mechanical devices and electronic components for locomotion, controlling movement of the MSSV, surveying and wireless communication,
   wherein the open frame structure of the chassis, the open bottom portion of the shell and the one or more vents in the shell allow water to freely flow into and out of the interior when the MSSV moves into and out of a body of water.

2. The MSSV according to claim 1, wherein one of the plurality of watertight modules is a hydraulic propulsion module comprising an electric motor and a hydraulic pump.

3. The MSSV according to claim 1, wherein one of the plurality of watertight modules is a control processing unit (CPU) module comprising a CPU for controlling the movement of the MSSV and/or for controlling surveying equipment.

4. The MSSV according to claim 3 further comprising a remote control device that communicates wirelessly with the CPU to provide remote control of the movement of the MSSV and/or remote control of the surveying equipment.

5. The MSSV according to claim 1, wherein one of the plurality of watertight modules comprises lightning arrestor equipment or one or more batteries.

6. The MSSV according to claim 1, wherein two or more of the plurality of watertight modules are connected by one or more watertight conduits.

7. The MSSV according to claim 1, wherein the shell comprises a bow wedge-shaped section that is attached to the first end of the chassis and a stern wedge-shaped section that is attached to the second end of the chassis, wherein the bow wedge-shaped section and the stern wedge-shaped section each has a top surface that slopes downwardly at an angle of from 20 degrees to 40 degrees from the top side of the chassis and a bottom surface that slopes upwardly at an angle of from 20 degrees to 40 degrees from the bottom side of the chassis as each extends to a bow and a stern, respectively.

8. The MSSV according to claim 1, wherein a bow rollover bar extends from the first end of the chassis and a stern rollover bar extends from the second end of the chassis.

9. The MSSV according to claim 1, wherein the open frame structure of the chassis comprises a plurality of elongate members extending parallel to the longitudinal axis and between a first bulkhead at the first end and a second bulkhead at the second end and a plurality of transverse ribs attached to the plurality of elongate members.

10. The MSSV according to claim 1, wherein each of the pair of continuous tracks comprises a hydraulic motor that is driven by a hydraulic pump actuated by a variable speed electric motor in one of the plurality of watertight modules.

11. The MSSV according to claim 1, wherein the chassis comprises a mast support structure that extends from the bottom side of the chassis, through the top wall of the shell to a mast base plate.

12. The MSSV according to claim 11 further comprising a mast that extends upwardly from the mast base plate to a mast top.

13. The MSSV according to claim 12, wherein a mast topper is disposed on the top of the mast, wherein the mast topper has one or more members extending outwardly from the mast that supports a radio antenna, a global positioning antenna, a WiFi an antenna, a light and/or a camera.

14. The MSSV according to claim 12, wherein the mast base plate has a top surface and is connected to the mast support structure by a hinge that pivots the surface of the mast base plate between a vertical and horizontal orientation, and the MSSV further comprising a gin pole attached to the hinged mast base plate and extending in the direction of the second end of the chassis, wherein, when the mast is in a vertical orientation, the gin pole forms an angle with the mast of from 60 degrees to 90 degrees.

15. The MSSV according to claim 14 further comprising a winch stand having an elongate member extending outwardly from the second end of the chassis to a distal end and a stanchion extending upwardly from the distal end to a winch support platform, wherein the winch stand and gin pole are adapted to raise the mast.

16. The MSSV according to claim 1, wherein the chassis has a bow bulkhead at the first end and a stern bulkhead at the second end, and wherein each bulkhead has a port side and a starboard side.

17. The MSSV according to claim 16, wherein a member with an aperture extends upwardly from the port side and the starboard side of each of the bow and stern bulkheads and above the top wall of the shell, and wherein the apertures are adapted for the connection of cables that are used to lift the MSSV.

18. The MSSV according to claim 1, wherein one of the plurality of watertight modules is a control processing unit (CPU) module comprising a controller that communicates with a wireless remote control device to remotely control the movement of the MSSV, a camera, a spotlight and/or a robotic device.

19. The MSSV according to claim 1, wherein one of the plurality of watertight modules is a control processing unit (CPU) module comprising a global position system, an inclinometer, and/or a laser distance measuring device, which communicate wirelessly with a tablet computer or lap top computer.

20. The MSSV according to claim 1 further comprising an auxiliary power module comprising a trailer attached to the MSSV and a gas-powered electric generator housed in an enclosure, wherein the gas powered electric generator provides electric power to the MSSV.

21. A modular submersible survey vehicle (MSSV) comprising:
a pair of continuous tracks, wherein each of the pair of continuous tracks comprises a hydraulic motor that is driven by a hydraulic pump actuated by a variable speed electric motor;
a chassis mounted on the pair of continuous tracks, wherein the chassis has a longitudinal axis extending between a first end and a second end, first and second sides, a top side, and a bottom side, and wherein the chassis has an open frame structure that allows water to freely pass through;
a shell attached to the chassis and comprising a top wall extending between side walls on the first and second sides of the chassis that define an interior and an open bottom portion, wherein the shell comprises one or more vents;
a watertight hydraulic power unit (HPU) module comprising an electric motor and a hydraulic pump;
a watertight control processing unit (CPU) module comprising a CPU for controlling the movement of the MSSV and/or for controlling surveying equipment, wherein the CPU module further comprises electronic components for wireless communication with a tablet computer or lap top computer, a global position system, an inclinometer, and/or a laser distance measuring device; and
one or more watertight conduits connecting the HPU module and the CPU module, wherein the open frame structure of the chassis, the open bottom portion of the shell and the one or more vents in the shell allow water to freely flow into and out of the interior when the MSSV moves into and out of a body of water.

22. The MSSV according to claim 21 further comprising a remote control device that communicates wirelessly with the CPU to provide remote control of the movement of the MSSV and/or remote control of the surveying equipment.

23. The MSSV according to claim 21 further comprising a watertight module comprising lightning arrestor equipment or one or more batteries.

24. The MSSV according to claim 21, wherein the shell comprises a bow wedge-shaped section that is attached to the first end of the chassis and a stern wedge-shaped section that is attached to the second end of the chassis, wherein the bow wedge-shaped section and the stern wedge-shaped section each has a top surface that slopes downwardly at an angle of from 20 degrees to 40 degrees from the top side of the chassis and a bottom surface that slopes upwardly at an angle of from 20 degrees to 40 degrees from the bottom side of the chassis.

25. The MSSV according to claim 21, wherein the open frame structure of the chassis comprises a plurality of elongate members extending parallel to the longitudinal axis and between a first bulkhead at the first end of the chassis and a second bulkhead at the second end of the chassis, and a plurality of transverse ribs attached to the plurality of elongate members.

26. The MSSV according to claim 21, wherein the chassis comprises a mast support structure that extends from the bottom side of the chassis, through the top wall of the shell to a mast base plate, a mast that extends upwardly from the mast base plate to a mast top, and a mast topper attached to the mast top, wherein the mast topper has one or more members extending outwardly from the mast that supports a radio antenna, a global positioning antenna, a WiFi an antenna, a light and/or a camera.

27. A modular submersible survey vehicle (MSSV) comprising:
a pair of continuous tracks, wherein each of the pair of continuous tracks comprises a hydraulic motor that is driven by a hydraulic pump actuated by a variable speed electric motor;
a chassis mounted on the pair of continuous tracks, wherein the chassis has a longitudinal axis extending between a first end and a second end, first and second sides, a top side, and a bottom side, and wherein the chassis comprises a plurality of elongate members extending parallel to the longitudinal axis and between a first bulkhead at the first end and a second bulkhead at the second end and a plurality of transverse ribs attached to the plurality of elongate members that defines an open frame structure that allows water to freely pass through the chassis;
a shell attached to the chassis and comprising a top wall extending between side walls on the first and second sides of the chassis, the top wall and the side walls define an interior and an open bottom portion, wherein the shell comprises one or more vents, a bow wedge-shaped section that is attached to the first end of the chassis and a stern wedge-shaped section that is attached to the second end of the chassis, wherein the bow wedge-shaped section and the stern wedge-shaped section each has a top surface that slopes downwardly at an angle of from 20 degrees to 40 degrees from the top side of the chassis and a bottom surface that slopes upwardly at an angle of from 20 degrees to 40 degrees from the bottom side of the chassis;
a watertight hydraulic power unit (HPU) module comprising an electric motor and a hydraulic pump;
a watertight control processing unit (CPU) module comprising a CPU for controlling the movement of the MSSV and/or for controlling surveying equipment, wherein the CPU module further comprises electronic components for wireless communication with a tablet computer or lap top computer, a global position system, an inclinometer, and/or a laser distance measuring device; and
one or more watertight conduits connecting the HPU module and the CPU module, wherein the open frame structure of the chassis, the open bottom portion of the shell and the one or more vents in the shell allow water to freely flow into and out of the interior when the MSSV moves into and out of a body of water.

28. The MSSV according to claim 27 further comprising a remote control device that communicates wirelessly with the CPU to provide remote control of the movement of the MSSV and/or remote control of the surveying equipment.

29. The MSSV according to claim 27, wherein one of the plurality of watertight modules comprises lightning arrestor equipment or one or more batteries.

30. The MSSV according to claim 27, wherein the chassis comprises a mast support structure that extends from the bottom side of the chassis, through the top wall of the shell to a mast base plate, a mast that extends upwardly from the mast base plate to a mast top, and a mast topper attached to the mast top, wherein the mast topper has one or more members extending outwardly from the mast that supports a radio antenna, a global positioning antenna, a WiFi an antenna, a light and/or a camera.

* * * * *